US012068901B2

(12) United States Patent
Jiang et al.

(10) Patent No.: US 12,068,901 B2
(45) Date of Patent: Aug. 20, 2024

(54) TECHNIQUES FOR PEAK-TO-AVERAGE-POWER-RATIO REDUCTION IN A DISCRETE FOURIER TRANSFORM DOMAIN FOR WIRELESS WAVEFORMS

(71) Applicant: QUALCOMM Incorporated, San Diego, CA (US)

(72) Inventors: Jing Jiang, San Diego, CA (US); Peter Gaal, San Diego, CA (US); John Edward Smee, San Diego, CA (US); Pushkar Bajirao Kulkarni, San Diego, CA (US); Hari Sankar, San Diego, CA (US); Sanghoon Kim, Saratoga, CA (US); Seyong Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 250 days.

(21) Appl. No.: 17/514,996

(22) Filed: Oct. 29, 2021

(65) Prior Publication Data
US 2023/0133797 A1    May 4, 2023

(51) Int. Cl.
| | | |
|---|---|---|
| H04L 27/26 | (2006.01) | |
| H04W 72/04 | (2023.01) | |
| H04W 72/044 | (2023.01) | |

(52) U.S. Cl.
CPC ....... *H04L 27/2614* (2013.01); *H04W 72/044* (2013.01)

(58) Field of Classification Search
CPC ............. H04L 27/2614; H04L 27/2623; H04L 27/2621; H04L 27/262; H04L 27/2624;
(Continued)

(56) References Cited

U.S. PATENT DOCUMENTS

| | | |
|---|---|---|
| 9,008,223 B1 | 4/2015 | Tamma et al. |
| 2006/0126748 A1 | 6/2006 | Lin et al. |

(Continued)

FOREIGN PATENT DOCUMENTS

| | | |
|---|---|---|
| EP | 2704388 A1 | 3/2014 |
| WO | WO-2004073182 A2 | 8/2004 |

OTHER PUBLICATIONS

"Huang Tang et al., A Novel Method for Converting the N-point Complex Sequence of Frequency-Domain to 2N-Point Real Sequence of Time-Domain with N-Point IFFT Computation, 2011 International Conference on Computer Science and Service System (CSSS), pp. 1-4" (Year: 2011).*

(Continued)

*Primary Examiner* — Rasheed Gidado
(74) *Attorney, Agent, or Firm* — Holland & Hart LLP

(57) ABSTRACT

Methods, systems, and devices for wireless communications are described. In some systems, a transmitting device may perform a pre-distortion of a signal on a resource allocation for the signal and using discrete Fourier transform (DFT)-domain processing. For example, the transmitting device may perform a first frequency-domain (FD) to time-domain (TD) transform, which may be an example of an inverse DFT (IDFT), on a first set of FD symbols to obtain a first set of TD samples. A size of the first FD to TD transform may be based on the resource allocation for the signal. The transmitting device may perform a crest factor reduction (CFR) function on the first set of TD samples to pre-distort the signal in the TD (e.g., in the IDFT domain), which may enable the transmitting device to avoid out-of-band (OOB) emission or otherwise have greater control over where the pre-distortion contributes energy.

26 Claims, 11 Drawing Sheets

(58) Field of Classification Search
CPC ............. H04L 27/2618; H04L 27/2613; H04L 27/2636; H04W 72/044
See application file for complete search history.

(56) References Cited

U.S. PATENT DOCUMENTS

| | | |
|---|---|---|
| 2008/0043877 A1* | 2/2008 | Chen .................. H04L 27/2623 375/295 |
| 2008/0205451 A1* | 8/2008 | Ramesh ................ H04L 5/0007 375/E7.173 |
| 2008/0219372 A1 | 9/2008 | Hori et al. |
| 2014/0161202 A1 | 6/2014 | Gunturi et al. |
| 2016/0191110 A1 | 6/2016 | Brecher et al. |
| 2018/0205586 A1* | 7/2018 | Park ................... H04L 27/2618 |
| 2018/0212810 A1* | 7/2018 | Park ................... H04L 27/2621 |
| 2018/0219713 A1 | 8/2018 | Jia et al. |

OTHER PUBLICATIONS

International Search Report and Written Opinion—PCT/US2022/045100—ISA/EPO—Mar. 3, 2023 (2106666WO).
Partial International Search Report—PCT/US2022/045100—ISA/EPO—Jan. 10, 2023 (2106666WO).

* cited by examiner

TECHNIQUES FOR PEAK-TO-AVERAGE-POWER-RATIO REDUCTION IN A DISCRETE FOURIER TRANSFORM DOMAIN FOR WIRELESS WAVEFORMS

FIELD OF TECHNOLOGY

The following relates to wireless communications, including techniques for peak-to-average-power ratio (PAPR) reduction in a discrete Fourier transform (DFT) domain for wireless waveforms.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some systems, devices, such as UEs and base stations, may communicate wirelessly via over-the-air signaling. In such systems, a transmitting device may generate a waveform, map the waveform to a set of time and frequency resources, and transmit the waveform over the set of time and frequency resources.

SUMMARY

The described techniques relate to improved methods, systems, devices, and apparatuses that support techniques for peak-to-average-power ratio (PAPR) reduction in a discrete Fourier transform (DFT) domain for wireless waveforms. Generally, the described techniques provide for pre-distorting a signal in a DFT domain on a set of resources that are allocated for the signal. Such a pre-distortion in the DFT domain on the set of resources that are allocated for the signal may enable a transmitting device to fold the pre-distortion of the signal onto the set of resources that are allocated for the signal and to avoid contributing to out-of-band (OOB) emissions. For example, the transmitting device may perform a first frequency-domain (FD) to time-domain (TD) transform, which may be an example of a first inverse DFT (IDFT), to obtain a first set of TD samples from a first set of FD tones associated with the signal. In some implementations, the transmitting device may set a size for the first FD to TD transform based on the resource allocation for the signal. As such, the transmitting device may perform a crest factor reduction (CFR) function on the first set of TD samples in the IDFT domain to pre-distort the signal on the set of resources allocated for the signal. After pre-distorting the signal, the transmitting device may perform a first TD to FD transform (e.g., a first DFT) to obtain a second set of FD tones (e.g., to go back to the FD), may allocate the second set of FD tones to subcarriers, may perform a second FD to TD transform (e.g., a second IDFT) to obtain a third set of TD samples, and may transmit the signal based on the third set of TD samples.

A method for wireless communication at a device is described. The method may include performing a first FD to TD transform on a first set of FD tones to obtain a first set of TD samples, where the first FD to TD transform has a first transform size, performing a crest factor reduction function on the first set of TD samples to obtain a second set of TD samples, performing a first TD to FD transform on the second set of TD samples to obtain a pre-distorted set of FD tones, mapping the pre-distorted set of FD tones to at least a portion of a second set of FD tones, where the second set of FD tones is larger than the first set of FD tones, performing a second FD to TD transform on the second set of FD tones to obtain a third set of TD samples, where the second FD to TD transform has a second transform size that is larger than the first transform size, and transmitting signaling based on the third set of TD samples.

An apparatus for wireless communication at a device is described. The apparatus may include a processor, memory coupled with the processor, and instructions stored in the memory. The instructions may be executable by the processor to cause the apparatus to perform a first FD to TD transform on a first set of FD tones to obtain a first set of TD samples, where the first FD to TD transform has a first transform size, perform a crest factor reduction function on the first set of TD samples to obtain a second set of TD samples, perform a first TD to FD transform on the second set of TD samples to obtain a pre-distorted set of FD tones, map the pre-distorted set of FD tones to at least a portion of a second set of FD tones, where the second set of FD tones is larger than the first set of FD tones, perform a second FD to TD transform on the second set of FD tones to obtain a third set of TD samples, where the second FD to TD transform has a second transform size that is larger than the first transform size, and transmit signaling based on the third set of TD samples.

Another apparatus for wireless communication at a device is described. The apparatus may include means for performing a first FD to TD transform on a first set of FD tones to obtain a first set of TD samples, where the first FD to TD transform has a first transform size, means for performing a crest factor reduction function on the first set of TD samples to obtain a second set of TD samples, means for performing a first TD to FD transform on the second set of TD samples to obtain a pre-distorted set of FD tones, means for mapping the pre-distorted set of FD tones to at least a portion of a second set of FD tones, where the second set of FD tones is larger than the first set of FD tones, means for performing a second FD to TD transform on the second set of FD tones to obtain a third set of TD samples, where the second FD to TD transform has a second transform size that is larger than the first transform size, and means for transmitting signaling based on the third set of TD samples.

A non-transitory computer-readable medium storing code for wireless communication at a device is described. The code may include instructions executable by a processor to perform a first FD to TD transform on a first set of FD tones to obtain a first set of TD samples, where the first FD to TD transform has a first transform size, perform a crest factor reduction function on the first set of TD samples to obtain a second set of TD samples, perform a first TD to FD transform on the second set of TD samples to obtain a pre-distorted set of FD tones, map the pre-distorted set of FD tones to at least a portion of a second set of FD tones, where the second set of FD tones is larger than the first set of FD tones, perform a second FD to TD transform on the second set of FD tones to obtain a third set of TD samples, where the second FD to TD transform has a second transform size that is larger than the first transform size, and transmit signaling based on the third set of TD samples.

Some examples of the method, apparatuses, and non-transitory computer-readable medium described herein may further include operations, features, means, or instructions for identifying a resource allocation for the signaling, the resource allocation associated with a quantity of FD tones, where the first transform size of the first FD to TD transform may be based on the quantity of FD tones.

In some examples of the method, apparatuses, and non-transitory computer-readable medium described herein, mapping the pre-distorted set of FD tones to at least the portion of the second set of FD tones may include operations, features, means, or instructions for mapping the pre-distorted set of FD tones to a set of subcarriers, the set of subcarriers based on a resource allocation for the signaling, where performing the second FD to TD transform on the second set of FD tones may be based on mapping the pre-distorted set of FD tones to the set of subcarriers.

Some examples of the method, apparatuses, and non-transitory computer-readable medium described herein may further include operations, features, means, or instructions for applying a first phase ramp to the first set of FD tones to obtain a phase-ramped set of FD tones, the first phase ramp corresponded to a first TD shift for the first set of TD samples, where performing the first FD to TD transform includes performing the first FD to TD transform on the phase-ramped set of FD tones and performing, after applying the first phase ramp to the first set of FD tones, a third FD to TD transform on an initial set of FD tones to obtain the first set of TD samples.

Some examples of the method, apparatuses, and non-transitory computer-readable medium described herein may further include operations, features, means, or instructions for applying an inverse of the first phase ramp to the pre-distorted set of FD tones to remove the first TD shift and to obtain a first pre-distorted set of FD tones, where transmitting the signaling may be based on applying the inverse of the first phase ramp to the pre-distorted set of FD tones to remove the first TD shift.

Some examples of the method, apparatuses, and non-transitory computer-readable medium described herein may further include operations, features, means, or instructions for applying a second phase ramp to the first pre-distorted set of FD tones to obtain a second phase-ramped set of FD tones, the second phase ramp associated with a second TD shift for the first set of TD samples, performing a third FD to TD transform on the second phase-ramped set of FD tones to obtain a fourth set of TD samples, performing a second crest factor reduction function on the fourth set of TD samples to obtain a fifth set of TD samples, performing a third TD to FD transform on the fifth set of TD samples to obtain a third set of FD tones, and applying an inverse to the second phase ramp on the third set of FD tones to remove the second TD shift and to obtain a second pre-distorted set of FD tones, where mapping the pre-distorted set of FD tones to the second set of FD tones includes mapping the second pre-distorted set of FD tones to the second set of FD tones.

Some examples of the method, apparatuses, and non-transitory computer-readable medium described herein may further include operations, features, means, or instructions for determining a power amplifier nonlinearity using the first set of TD samples and performing subband interference cancellation on the second set of FD tones based on the power amplifier nonlinearity, where transmitting the signaling may be based on performing the subband interference cancellation.

In some examples of the method, apparatuses, and non-transitory computer-readable medium described herein, performing the subband interference cancellation may include operations, features, means, or instructions for performing a second TD to FD transform on the power amplifier nonlinearity to obtain a FD power amplifier nonlinearity and subtracting the FD power amplifier nonlinearity from the second set of FD tones.

In some examples of the method, apparatuses, and non-transitory computer-readable medium described herein, performing the subband interference cancellation may include operations, features, means, or instructions for applying a FD weighting to the FD power amplifier nonlinearity prior to subtracting the FD power amplifier nonlinearity from the second set of FD tones.

Some examples of the method, apparatuses, and non-transitory computer-readable medium described herein may further include operations, features, means, or instructions for determining the FD power amplifier nonlinearity across a first set of frequency resources corresponding to a resource allocation associated with the signaling and a second set of resources external to the resource allocation associated with the signaling.

In some examples of the method, apparatuses, and non-transitory computer-readable medium described herein, a resource allocation associated with the signaling includes multiple sets of non-contiguous resources and the first transform size may be based on a size of the multiple sets of non-contiguous resources including one or more null resources between the multiple sets of non-contiguous resources and the method, apparatuses, and non-transitory computer-readable medium may include further operations, features, means, or instructions for applying, prior to performing the second FD to TD transform, an energy reduction scheme on a portion of the second set of FD tones associated with the one or more null resources between the multiple sets of non-contiguous resources.

Some examples of the method, apparatuses, and non-transitory computer-readable medium described herein may further include operations, features, means, or instructions for determining a residual error associated with performing the crest factor reduction function on the first set of TD samples and distributing the residual error across a frequency band associated with the signaling based on an error vector magnitude and an out-of-band emission associated with the signaling, where transmitting the signaling may be based on distributing the residual error across the frequency band.

In some examples of the method, apparatuses, and non-transitory computer-readable medium described herein, distributing the residual error across the frequency band may include operations, features, means, or instructions for allocating energy associated with the residual error to at least a subset of FD resources in the frequency band in accordance with a configured pattern.

In some examples of the method, apparatuses, and non-transitory computer-readable medium described herein, performing the crest factor reduction function may include operations, features, means, or instructions for performing the crest factor reduction function in accordance with an interference pattern associated with simultaneous transmissions from each of multiple antennas at the device such that an expected error vector magnitude at a receiver satisfies a threshold error vector magnitude and while suppressing OOB emission.

DETAILED DESCRIPTION

Figure 1:
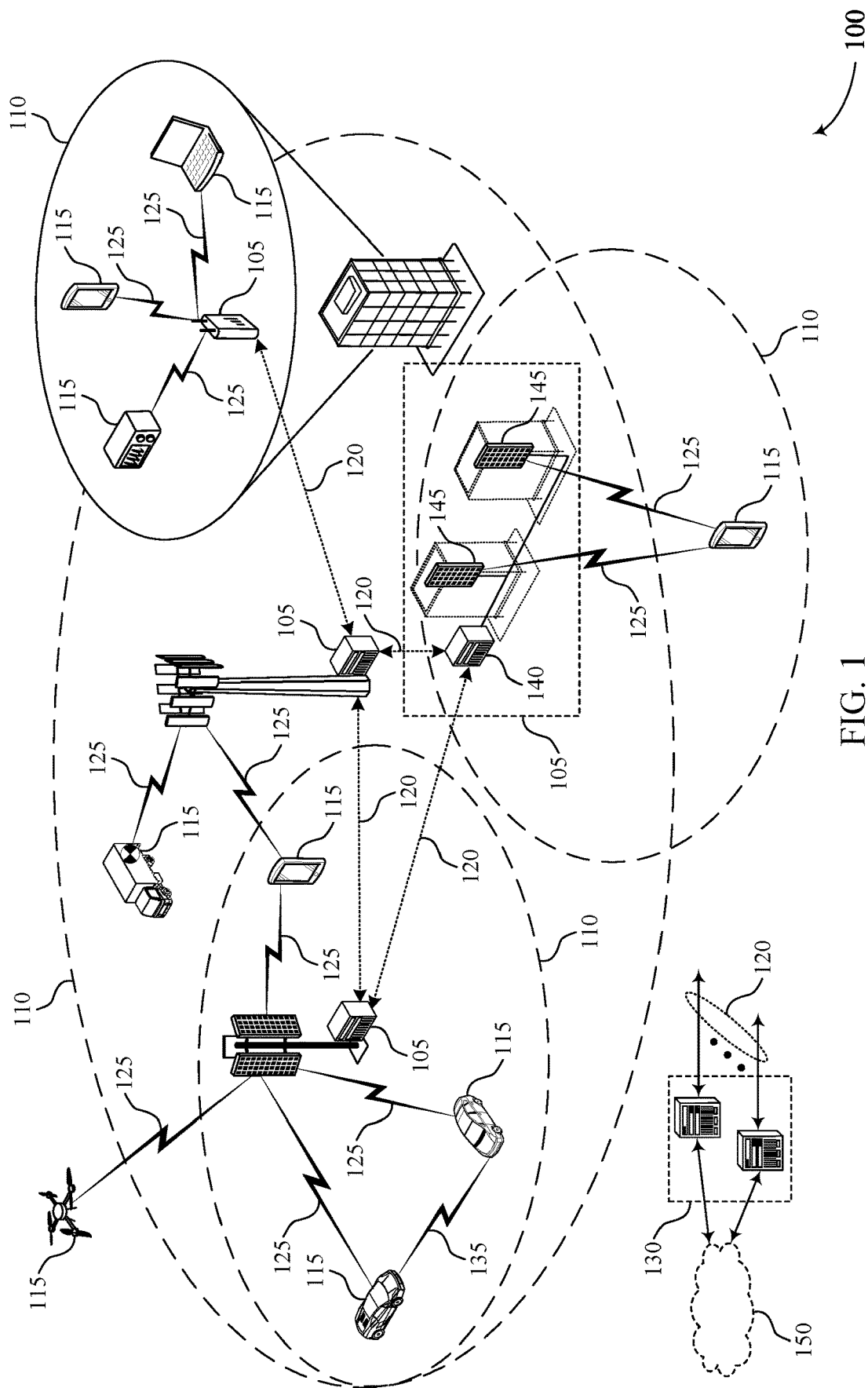
FIGS. 1 and 2 illustrate examples of wireless communications systems that support techniques for peak-to-average-power ratio (PAPR) reduction in a discrete Fourier transform (DFT) domain for wireless waveforms in accordance with examples as disclosed herein.

In some wireless communications systems, a transmitting device, such as a user equipment (UE) or a base station, may perform some pre-distortion to a signal prior to a transmission of the signal to achieve peak-to-average-power ratio (PAPR) reduction. For example, the transmitting device may clip (e.g., reduce) an amplitude or magnitude of one or more pulses of the signal to reduce a measured peak power associated with the signal, may filter the signal, and may transmit the signal with the reduced peak power. In some cases, the transmitting device may achieve the pre-distortion based on clipping the amplitude or magnitude of the one or more pulses of the signal in a fully-sampled signal domain. Such a pre-distortion of the signal in the fully-sampled signal domain may result in or otherwise be associated with some amount of pre-distortion contributing to out-of-band (OOB) emissions or to interference to other devices in the system.

In some implementations of the present disclosure, a transmitting device may perform the pre-distortion of the signal on a set of resources that are allocated for the signal and based on discrete Fourier transform (DFT) domain processing. For example, the transmitting device may perform a first frequency-domain (FD) to time-domain (TD) transform, which may be an example of an inverse DFT (IDFT), on a first set of FD tones (or FD symbols) to obtain a first set of TD samples. In some implementations, a size of the first FD to TD transform may be based on an amount of resource blocks (RBs) or subcarriers allocated for the signal. For example, if the transmitting device has a resource allocation of 600 subcarriers for the signal, the transmitting device may set a size of the first FD to TD transform such that the first FD to TD transform outputs 600 TD samples (e.g., such that the first set of TD samples includes 600 TD samples). The transmitting device may perform a crest factor reduction (CFR) function or scheme on the first set of TD samples (e.g., the 600 TD samples) to pre-distort the signal in the TD (e.g., in the IDFT domain), which may enable the transmitting device to avoid contributing to an OOB emission or to otherwise have greater control over where the pre-distortion contributes energy. For example, as a result of pre-distorting the signal in the TD (e.g., in the IDFT domain), the transmitting device may fold the pre-distortion onto the resources that are allocated for the signal and mitigate an OOB emission or interference contribution associated with the pre-distortion.

Particular implementations of the subject matter described in this disclosure can be implemented to realize one or more of the following potential advantages. For example, as a result of folding the pre-distortion onto the resources that are allocated for the signal and mitigating an OOB emission or interference contribution associated with the pre-distortion, the transmitting device may reduce its contribution to system interference. Such a reduction to system interference may increase the likelihood for successful communication between other devices in the system, potentially increasing system throughput and facilitating greater spectral efficiency, higher data rates, higher reliability, and greater system capacity. Further, in some implementations, the transmitting device may use the subsampled TD domain representation of the signal to model a nonlinear behavior of a power amplifier and have greater control of over which resources energy associated with CFR error is distributed, which may provide other benefits to the transmitting device in terms of reliability and to the system in terms of more predictable interference. This scheme may be particularly compelling for specific use cases, such as full duplex and subband full duplex use cases, in which an OOB emission can be detrimental to performance.

Aspects of the disclosure are initially described in the context of wireless communications systems. Aspects of the disclosure are additionally illustrated by and described with reference to a processing timeline, a subband interference cancellation scheme, and a process flow. Aspects of the disclosure are further illustrated by and described with reference to apparatus diagrams, system diagrams, and flowcharts that relate to techniques for PAPR reduction in a DFT domain for wireless waveforms.

FIG. 1 illustrates an example of a wireless communications system 100 that supports techniques for PAPR reduction in a DFT domain for wireless waveforms in accordance with examples as disclosed herein. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported DFT (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or expected functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some systems, such as the wireless communications system 100, a UE 115 and a base station 105 may communicate via over-the-air and waveform-based signaling. For example, the UE 115 and the base station 105 may communicate in accordance with a waveform framework based on an OFDMA time-frequency resource grid and, in some implementations, may support an OFDM-type waveform with DFT-domain processing. For example, the UE 115 and the base station 105 may use DFT-domain processing to convert some waveform types, such as single carrier (SC) quadrature amplitude modulation (QAM) waveforms or gaussian minimum shift keying (GMSK) waveforms, to fit into an OFDMA framework or to enhance some other OFDM-type waveforms.

In some implementations, a transmitting device (e.g., one or both of the UE 115 or the base station 105) may perform some IDFT/DFT domain processing for PAPR reduction without impacting (or with minimal or limited impact to) an adjacent channel leakage ratio (ACLR) or an OOB emission. In such implementations, the transmitting device may perform some DFT-domain digital post distortion and precoding to achieve PAPR reduction without impacting ACLR or contributing to OOB emissions. The transmitting device may apply such DFT-domain digital post distortion and precoding to OFDM-type waveforms as well as to SC waveforms, such as DFT spread FDM (DFT-S-DFM) or DFT spread OFDM (DFT-S-OFDM) waveforms (e.g., TD waveforms).

Figure 2:
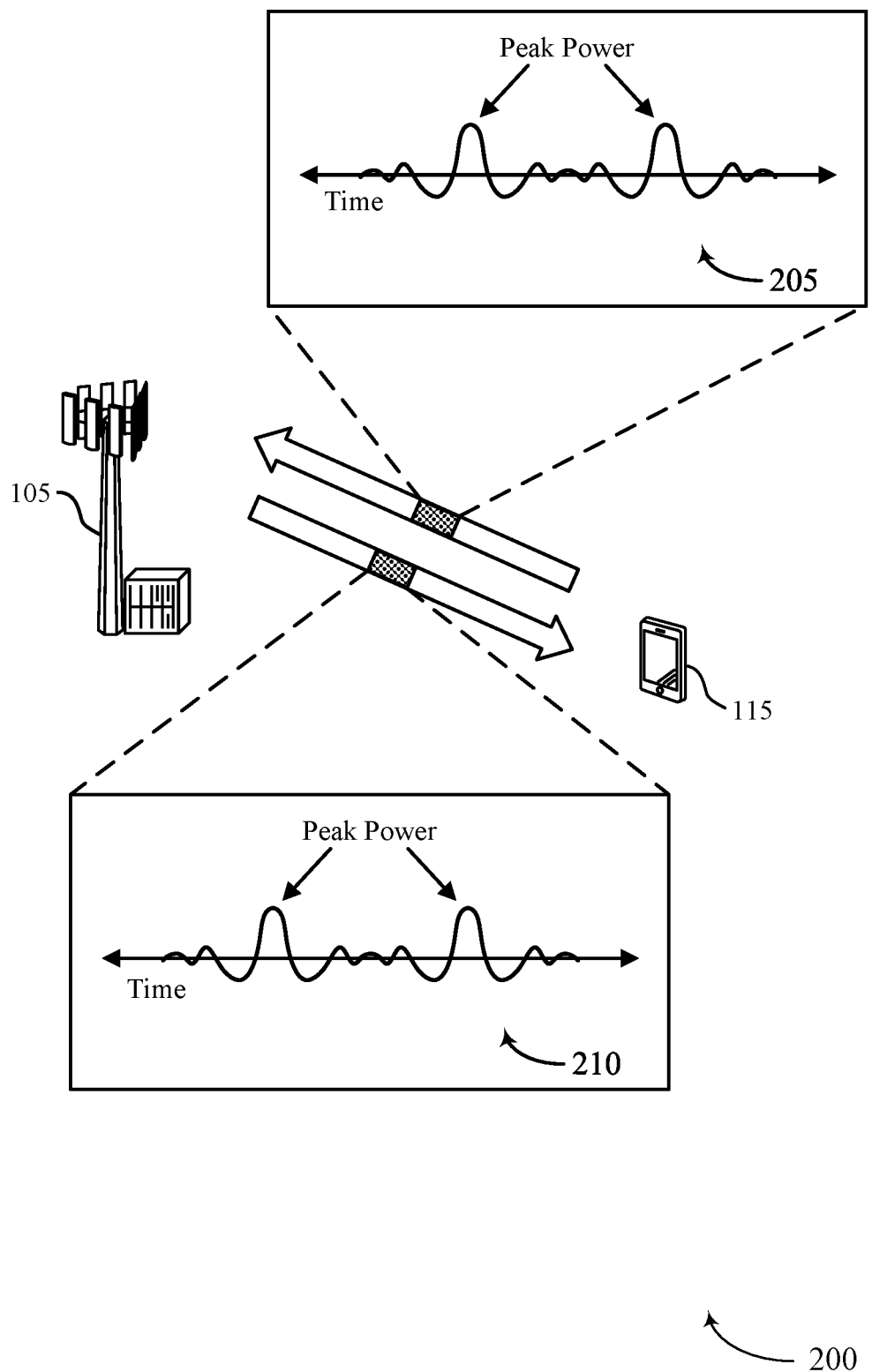

FIG. 2 illustrates an example of a wireless communications system 200 that supports techniques for PAPR reduction in a DFT domain for wireless waveforms in accordance with examples as disclosed herein. The wireless communications system 200 may implement or be implemented to realize aspects of the wireless communications system 100. For example, the wireless communications system 200 illustrates communication between a UE 115 and a base station 105, which may be examples of corresponding devices described herein, including with reference to FIG. 1. In some implementations, a transmitting device (e.g., one or both of the UE 115 or the base station 105) may apply some pre-distortion to a signal on a set of allocated RBs based on DFT-domain processing (e.g., instead of a clip and filter technique in a fully-sampled signal domain).

For example, the UE 115 and the base station 105 may communicate via over-the-air and waveform-based signaling. The UE 115 and the base station 105 may communicate in accordance with a waveform framework based on an OFDMA time-frequency resource grid and, in some implementations, may support an OFDM-type or SC-type waveform with DFT-domain processing. In some examples, and as shown in FIG. 2, the UE 115 may generate and transmit a waveform 205 and the base station 105 may generate and transmit a waveform 210.

In some implementations, a transmitting device (e.g., one or both of the UE 115 or the base station 105) may receive or otherwise identify a resource allocation for a signal, the signal being associated with a first set of FD tones. In some aspects, the resource allocation may include a quantity of RBs, such as OFDM-allocated RBs. In an example, the resource allocation for the signal may include 50 RBs, or 600 subcarriers, and the transmitting device may take a 600-sample IDFT on the first set of FD tones associated with the signal to obtain 600 TD samples.

In some implementations, to reduce a PAPR associated with the signal without impacting ACLR, the transmitting device may perform a CFR function on the 600 TD samples. In other words, the transmitting device may take an OFDM (or DFT-S-FDM or SC-FDM) waveform to a subsampled TD (e.g., 600 TD samples based on taking a 600-sample IDFT in accordance with a 600 subcarrier resource allocation) and the transmitting device may perform the CFR function on the TD samples in the IDFT domain based on a threshold or some scaling associated with the signal magnitude. In such implementations, the transmitting device may achieve a relatively low PAPR via the performing of the CFR function in the (subsampled) IDFT-domain. For example, performing the CFR function in the IDFT-domain may enable the transmitting device to fold distortion in-band of the resource allocation with controlled error vector magnitude (EVM) without introducing in-band emission or ACLR. Such an approach may differ from other approaches involving a clip and filter scheme for a full-size IDFT as it employs a reduced fast Fourier transform (FFT) size. Further, such an approach may provide performance improvements in both low spectrum efficiency (SPEF) modulation and high SPEF modulation. The CFR function may include one or both of a clipping function or a companding function.

In examples in which the transmitting device performs a clipping function on the 600 TD samples, the transmitting device may clip the TD samples in the IDFT-domain representation of the signal based on a threshold or some scaling associated with signal magnitude. For example, the transmitting device may identify one or more regions of relatively high amplitude or magnitude (e.g., areas in which an amplitude or a magnitude exceeds a threshold), which may correspond to areas of peak power of the signal, and the transmitting device may "clip" such relatively high amplitudes or magnitudes. In other words, the transmitting device may reduce the amplitude or magnitude of such identified regions such that their amplitudes or magnitudes do not exceed a threshold.

In examples in which the transmitting device performs a companding function on the 600 TD samples, the transmitting device may command, or compress, the TD samples in the IDFT-domain or TD representation of the signal based on a threshold or some scaling associated with signal magnitude. For example, the transmitting device may identify one or more regions of relatively high amplitude or magnitude (e.g., areas in which an amplitude or a magnitude exceeds a threshold), which may correspond to areas of peak power of the signal, and the transmitting device may compress (e.g., reduce in a smooth manner) such relatively high amplitudes or magnitudes.

For some waveform types, such as for DFT-S-OFDM waveform types or DFT-S-FDM waveform types (e.g., TD waveform types), the waveform in the IDFT may already have a relatively (e.g., sufficiently) low PAPR and the transmitting device may determine that there is region of a pulse that has an amplitude or magnitude exceeding a threshold. For such waveform types, the transmitting device may take a fractional sample offset (e.g., a 0.5 TD sample offset) of IDFT TD samples, which may be associated with a relatively higher PAPR, and may perform a CFR function on the samples in the IDFT TD at the fractional sample offset. Additional details relating to such an application of a CFR function at a fractional sample offset are illustrated by and described with reference to FIG. 3. Further, as also described with reference to FIG. 3 and further with reference to FIG. 5, the transmitting device may iteratively apply sample offsets and perform a CFR function for each of multiple sample offsets in an iterative manner.

The transmitting device may leverage such DFT-domain or subsampled-domain processing for one or more other use cases, including subband interference cancellation, non-contiguous allocation for an OFDM signal, intentional or controlled distribution of CFR error, and digital post distortion correction. In some implementations, for example, the transmitting device may extend the use of DFT-domain or subsampled-domain processing to subband interference cancellation. In such implementations, the transmitting device may use a subsampled FFT/DFT size that is sufficient to cover both resources allocated for the signal and an out-of-allocation region where the transmitting device expects or assumes there may be an OOB emission associated with the signal.

For example, the transmitting device may use the relatively small DFT/FFT size (e.g., relative to a fully-sampled signal domain size) to obtain the set of TD samples (e.g., in the IDFT-domain) and may model power amplifier nonlinear behavior in the subsampled TD. In some aspects, due to a memoryless nature of the model, a subsampled version of the model may be sufficiently accurate. Based on obtaining the model power amplifier nonlinear behavior in the sub-sampled TD, the transmitting device may transform the TD samples back to the FD to obtain a set of FD tones (e.g., a second set of FD tones) after the distortion is modeled and may perform FD subband interference cancellation on the set of FD tones (e.g., the second set of FD tones) after power amplifier distortion is introduced.

In some implementations, the transmitting device may perform the subband interference cancellation based on performing a TD to FD transform (e.g., a DFT/FFT) on the power amplifier nonlinearity to obtain an FD power amplifier nonlinearity and may subtract the FD power amplifier nonlinearity from the set of FD tones (e.g., the second set of FD tones). The transmitting device also may, in some examples, apply an FD weighting to the FD power amplifier nonlinearity prior to subtracting the FD power amplifier nonlinearity from the set of FD tones (e.g., the second set of FD tones). Further, in some examples, and based on using the subsampled FFT/DFT size that is sufficient to cover both resources allocated for the signal and an out-of-allocation region where the transmitting device expects or assumes there may be an OOB emission associated with the signal, the transmitting device may determine the FD power amplifier nonlinearity across a first set of frequency resources corresponding to the resource allocation for the signal and a second set of resources external to the resource allocation for the signal. Additionally or alternatively, the transmitting device may discard a band edge part of the signal in the relatively small DFT/FFT domain (e.g., not to cancel or not fully canceled). For example, the set of TD samples may become aliased at the band edge part of the signal and the transmitting device may discard the band edge to avoid such aliasing. Additional details relating to subband interference cancellation are illustrated by and described with reference to FIG. 4.

In addition or as an alternative to extending implementation to support subband interference cancellation, the transmitting device may support an implementation to non-contiguous resource allocations for OFDM-type waveforms. In implementations in which the resource allocation for the signal (e.g., an OFDM signal) is not contiguous, such that there are some gaps between subcarriers, resource blocks, or symbols occupied by the signal, the transmitting device may use an FD to TD transform size (e.g., a DFT/FFT size) that is sufficient to cover all allocations for the signal (e.g., including null or un-occupied resources between sets of allocations for the signal). Accordingly, the transmitting device may perform the FD to TD transform (e.g., the IDFT/inverse FFT (IFFT)) having a size sufficient to cover all of the allocations for the signal to obtain the set of TD samples and may perform the CFR function (e.g., clipping or companding) on the set of TD samples. The transmitting device may also use a DFT size that is matched with or otherwise compatible with an implementation, such as a DFT size that is a composite number as a product of power of 2, 3, or 5, or any combination thereof.

The transmitting device, if transforming the set of TD samples back to the FD to obtain the set of FD tones (e.g., the second set of FD tones), may "zero-out," apply subband interference cancellation, or otherwise weight down a set of tones or subcarriers associated with the null, unoccupied, or empty resources over which the FD to TD transform was performed to mitigate an OOB emission (e.g., to achieve an OOB emission within an expected OOB emission range). In other words, the transmitting device may, in addition to allocating the signal to tones or subcarriers, apply an energy reduction scheme on a portion of the set of FD tones (e.g., the second set of FD tones) associated with the one or more null, unoccupied, or empty resources between the multiple sets of non-contiguous resources (e.g., tones in a middle dis-contiguous part between two sets of non-contiguous resources) that are allocated for the signal. In some implementations, the transmitting device may perform such an extension to non-contiguous OFDM resource allocations with multiple iterations using different fractional sample offsets to achieve further PAPR reduction.

In addition or as an alternative to extending implementation to support subband interference cancellation or to support non-contiguous OFDM resource allocation, the transmitting device may support an implementation to enable the transmitting device to allow OOB emission in a controlled manner. In some scenarios, such as in scenarios of relatively higher order modulation, EVM may become relatively large and may be a dominant (e.g., largest) source for error or signaling inefficiency for the signal and, in such scenarios, it may be desirable for the transmitting device to refrain from folding all CFR function-related distortions in-band. For example, the greater amount of CFR function-related distortions that the transmitting device folds in-band of the resource allocation for the signal, the less the signal may contribute to ACLR or OOB emission but the greater the EVM of the signal may become.

As such, there may be a trade-off between in-band folding of distortions and an EVM of the signal and the transmitting device may manage or control the pre-distortion of the signal on the TD samples such that the transmitting device may allocate some amount of the pre-distortion (e.g., some amount of energy associated with the pre-distortion) across a frequency band including the signal to balance EVM and OOB emission. For example, due to a property of the IDFT, the transmitting device may contribute the distortion related to the CFR function (or at least a portion of the distortion related to the CFR function) OOB in addition to or as an alternative to folding the distortion related to the CFR function (or at least a portion of the distortion related to the CFR function) in-band.

In some implementations, to achieve such a trade-off, the transmitting device may determine a residual error associated with performing the CFR function on the set of TD samples and may distribute the residual error across a frequency band associated with the signal based on (e.g., with consideration to) both an EVM and an OOB emission associated with the signal. For example, the transmitting device may allocate energy associated with the residual error to at least a subset of FD resources in the frequency band in accordance with a configured pattern (e.g., a frequency mask). In other words, the transmitting device may take the residual clipping or companding error and compute an IDFT of the error and, in the FD, may decompose the distortion and distribute the distortion across the frequency band according to a frequency mask (e.g., a configured pattern according to which the transmitting device may allocate energy associated with the distortion to frequency resources). As such, the transmitting device may allocate some portion of the energy associated with the residual error to resources that are OOB of the resource allocation for the signal to reduce a contribution to EVM while still folding some of the energy associated with the distortion in-band of the resource allocation for the signal to mitigate OOB emission contributions.

In addition or as an alternative to extending implementation to support subband interference cancellation, to support non-contiguous OFDM resource allocation, or to support an extension to enable the transmitting device to allow OOB emission in a controlled manner, the transmitting device may support an implementation to enable digital post distortion correction. For example, the transmitting device may perform one or more schemes for PAPR reduction associated with, employing, or otherwise leveraging beamforming configurations. For example, the transmitting device may transmit a waveform-based signal directionally (e.g., may focus constructive interference associated with the waveform-based signal at or toward a specific location) via multiple antennas or antenna elements based on applying different weights and phase shifts across the multiple antennas or antenna elements and, in some cases, an interference pattern associated with the transmitting of the signal via the multiple antennas or antenna elements may contribute to or detract from one or both of PAPR reduction or EVM reduction. Such schemes, however, may be associated with some difficulty to control OOB emission associated with the signal.

In some implementations, the transmitting device, employing the described IDFT-based scheme for PAPR reduction, may use the subsampled TD signal for CFR functions (e.g., clipping or companding) and iteration to distribute the folding of the distortion in-band or allowing OOB, or both, in a controlled way. As such, the transmitting device may perform the CFR function in accordance with a (known) interference pattern associated with simultaneous transmissions from each of multiple antennas or antenna elements at the transmitting device such that an expected EVM at a receiver satisfies a threshold EVM while still mitigating OOB emission associated with the signal. In other words, the transmitting device may selectively distribute the distortion associated with the CFR function in-band and OOB to maintain a relatively low ACLR or OOB emission while simultaneously maintaining a relatively high (expected) EVM or SNR at a receiver. In some aspects, the transmitting device may model an expected EVM or SNR at a receiver using known interference patterns associated with beamforming communication to the receiver and based on controlling in-band and OOB distribution of the CFR function-related distortion.

As such, the transmitting device may generate a signal, pre-distort (e.g., for PAPR reduction, OOB emission mitigation, ACLR mitigation, or EVM mitigation) the signal in a subsampled IDFT/IFFT domain (e.g., such as a subsampled TD based on an actual resource allocation for the signal), and may transmit the signal over-the-air. Further, although the described techniques are illustrated as being performed by UE 115 or a base station 105, any device capable of wireless communication may employ the described techniques to achieve PAPR reduction while mitigating OOB emission and ACLR.

Figure 3:
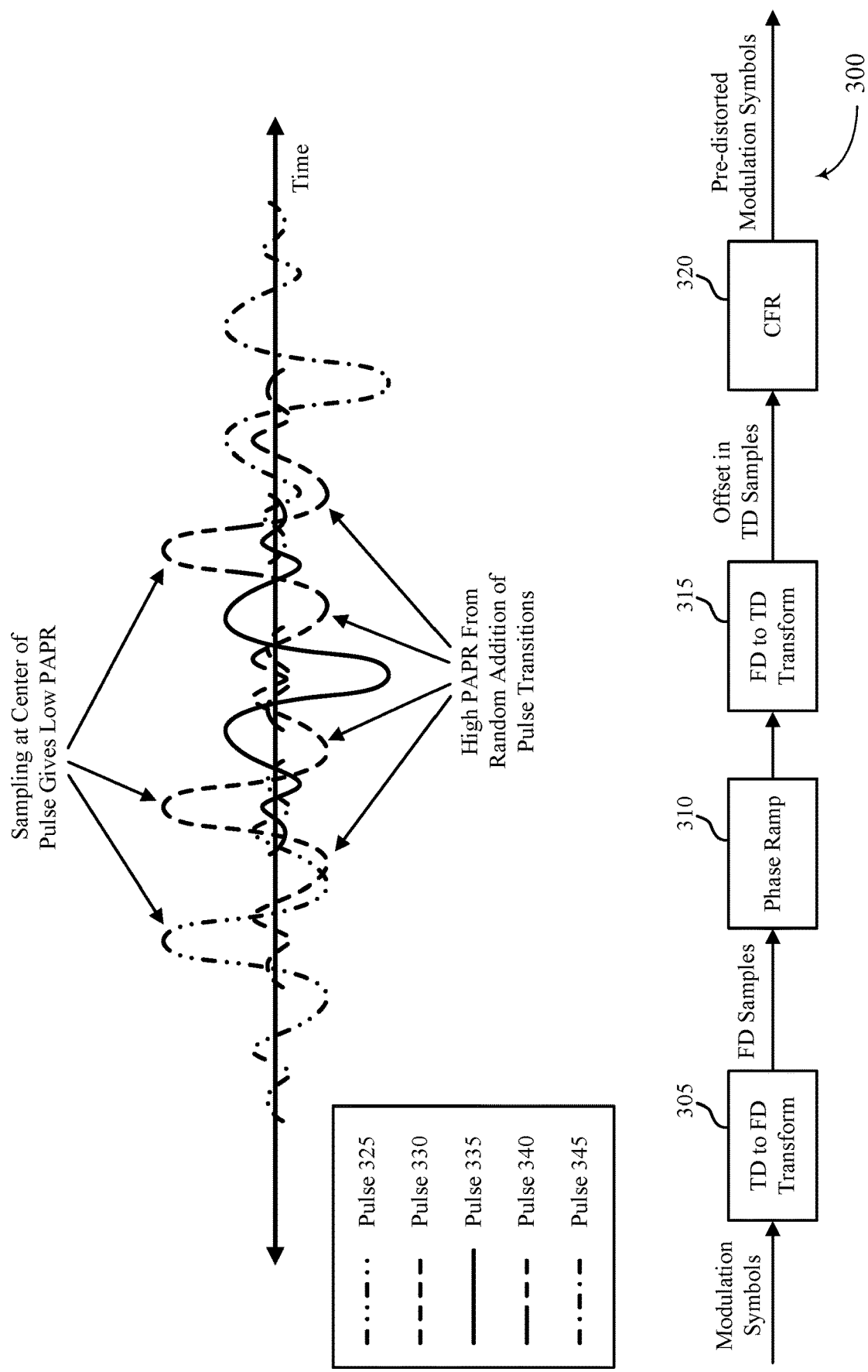
FIG. 3 illustrates an example of a processing timeline that supports techniques for PAPR reduction in a DFT domain for wireless waveforms in accordance with examples as disclosed herein.

FIG. 3 illustrates an example of a processing timeline 300 that supports techniques for PAPR reduction in a DFT domain for wireless waveforms in accordance with examples as disclosed herein. The processing timeline 300 may implement or be implemented to realize aspects of the wireless communications system 100 or the wireless communications system 200. For example, the processing timeline may be implemented by a transmitting device, such as a UE 115 or a base station 105 as illustrated by and described with reference to FIGS. 1 and 2, to achieve a sample offset in the TD for a CFR function. In some implementations, the transmitting device may implement the processing timeline 300 for some specific waveform types, such as for DFT-S-FDM or DFT-S-OFDM waveform types (e.g., TD waveform types).

For example, a generic DFT-S-FDM or DFT-S-OFDM waveform type in an IDFT domain may (already, such as without pre-distortion) feature a relatively low PAPR such that the transmitting device may be unable to detect any amplitudes or magnitudes for clipping or companding in the subsampled IDFT domain. For example, sampling such waveform types at a center of a pulse (e.g., a synchronization pulse) may be associated with a relatively low PAPR, such as a PAPR that satisfies (e.g., is less than) a threshold PAPR. Such waveform types, however, may have relatively high PAPR in sample locations in which multiple signaling pulses (e.g., multiple synchronization pulses) overlap in time. For example, high PAPR for such waveform types may appear or come from a random addition of multiple pulse transitions (e.g., oscillations associated with the pulse outside of its peak pulse and prior to "levelling out"). As shown in FIG. 3, areas of low PAPR and areas of high PAPR may exist in scenarios of random addition of multiple pulse transitions, including pulse transitions associated with a pulse 325, a pulse 330, a pulse 335, a pulse 340, and a pulse 345.

To reduce PAPR for such instances of random addition of multiple pulse transitions, the transmitting device may perform a first TD to FD transform 305 (e.g., a first DFT/FFT) to transform or convert from the subsampled TD waveform (e.g., which may be associated with an initial set of TD samples or modulation symbols) to the FD (e.g., to obtain a first set of FD tones associated with the signal). In some aspects, the transmitting device may set a size for the first TD to FD transform 305 (e.g., the first DFT/FFT) based on a size of a resource allocation for the signal. For example, for a signal with an allocation of 50 RBs or 600 subcarriers, the transmitting device may take a 600-point DFT of the modulation symbols associated with the signal to obtain the first set of FD tones. In some implementations, the transmitting device may apply a phase ramp 310 (e.g., a phase rotation) to the first set of FD tones to effectively achieve a TD sample offset (which may appear or show up in an IDFT TD).

As a result of applying the phase ramp 310 to the first set of FD tones, the transmitting device may perform a first FD to TD transform 315 (e.g., a first IDFT/IFFT) on the first set of FD tones (e.g., the first set of FD tones including or otherwise reflecting the phase ramp) to obtain a first set of TD samples associated with the signal reflecting a sample offset in the TD (e.g., in the IDFT TD). The transmitting device may perform a CFR function on the first set of TD samples (e.g., the first set of TD samples including or otherwise reflecting the sample offset) to obtain a set of pre-distorted modulation symbols. In some aspects, and as illustrated by and described in more detail with reference to FIG. 5, the transmitting device may perform a second TD to FD transform (e.g., a second DFT/FFT) of a same size as the first TD to FD transform 305 (e.g., a 600-point TD to FD transform) to obtain a second set of FD tones. The transmitting device may apply an inverse of the phase ramp (e.g., perform a phase ramp back to the original, un-ramped first set of FD tones) to the second set of FD tones to eliminate or remove the sample offset. The transmitting device may allocate the second set of FD tones (e.g., after removal of the phase ramp) to tones in a fully-sampled DFT/FFT (e.g., a 4k DFT/FFT or a 4096-point DFT/FFT) and may perform a second FD to TD transform (e.g., a second IDFT/IFFT) to obtain a set of baseband samples for transmission (e.g., to obtain TD samples of the waveform).

In some aspects, the sample offset which the transmitting device may apply to the first set of FD tones (e.g., via the phase ramp) may be a fractional sample offset. For example, the sample offset may be a 0.25 sample offset, a 0.5 sample offset, a 0.75 sample offset, or any other fractional (e.g., less than 1) sample offset. Further, although described in the context of a TD waveform, the transmitting device may perform a similar CFR 320 to TD samples having a sample offset for OFDM-type waveforms. In such examples in which the transmitting device applies a sample offset (e.g., a fractional sample offset) for OFDM-type waveforms, the transmitting device may apply the sample offset during a second iteration or pass of the DFT-domain processing (e.g., as a first iteration may focus on PAPR reduction for the OFDM waveform without a sampling offset).

For example, in some implementations, the transmitting device may take an iterative approach with a fractional sample offset. In such implementations, the transmitting device may further reduce PAPR for OFDM waveforms and, in some cases, for DFT-S-FDM waveforms using an iterative approach with a fractional sample offset. As part of an iterative approach, the transmitting device may sample at a fractional sample point offset multiple times (e.g., such that different iterations sample at different fractional sample point offsets) and may perform a CFR 320 on a set of TD samples in the IDFT TD (e.g., a subsampled domain) iteratively to reduce the PAPR. For example, the transmitting device may perform a CFR 320 on a set of TD samples in the IDFT TD with a 0.5 sample offset (or any other sample offset, such as a 0.75 sample offset) relative to the original samples during a first iteration or pass and may perform a CFR on the set of TD samples in the IDFT TD with a 0 sample offset (or any other sample offset, such as a 0.5 or 0.75 sample offset) relative to the original samples during a second iteration or pass.

As such, the transmitting device may clip or command the TD samples shifted by a fraction of a sample (which may provide for additional PAPR reduction) and, in some implementations, may additionally clip or command the TD samples without a sample offset or with another shift of a fraction of a sample (for further PAPR reduction). In some aspects, the transmitting device may select a fractional sample offset based on how the transmitting device expects or assume multiple pulses may overlap or interfere. In some aspects, a 0.5 sample offset may be associated with a potential worst-case scenario for interference and the transmitting device may use a 0.5 sample offset as a default.

Figure 4:
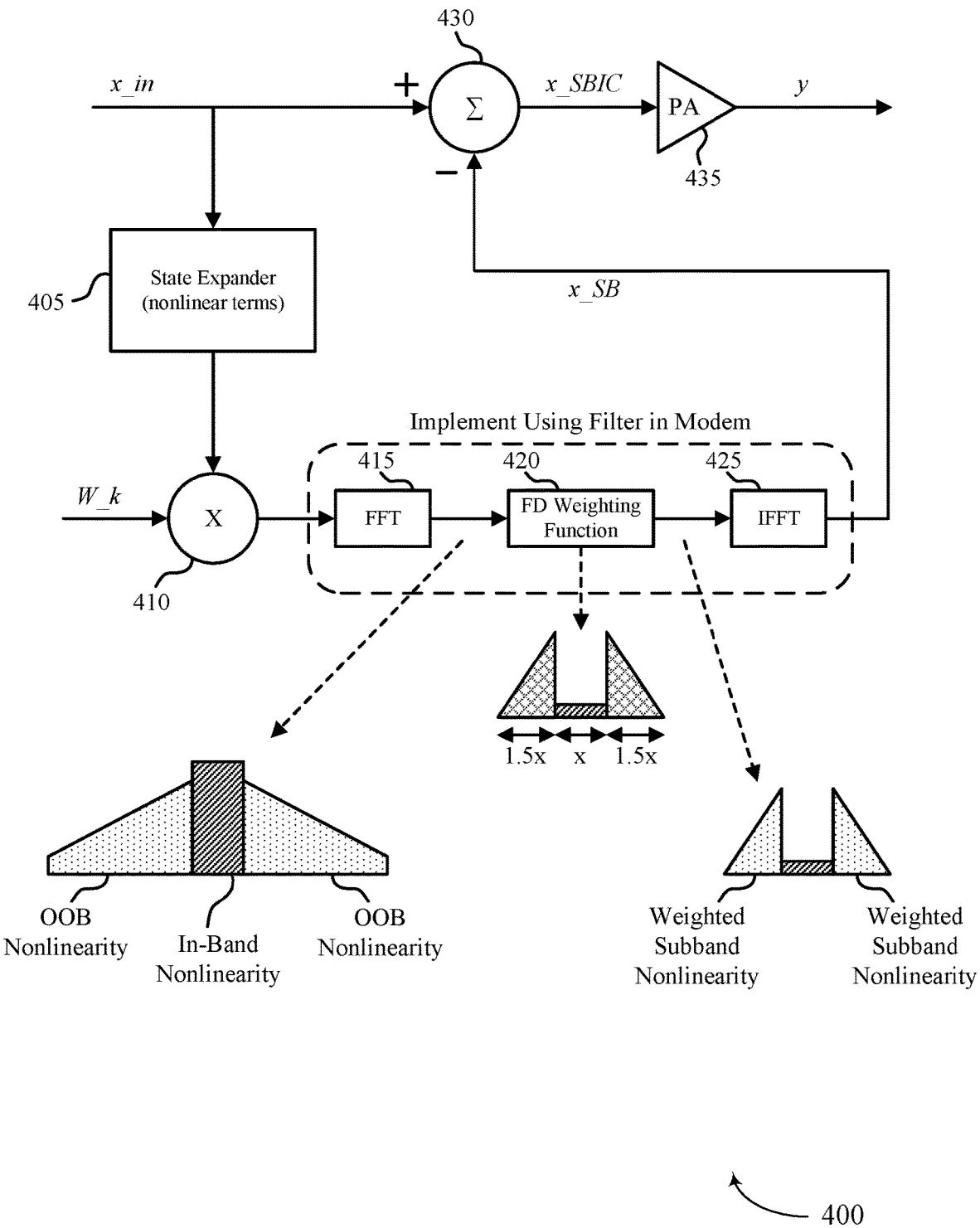
FIG. 4 illustrates an example of a subband interference cancellation scheme that supports techniques for PAPR reduction in a DFT domain for wireless waveforms in accordance with examples as disclosed herein.

FIG. 4 illustrates an example of a subband interference cancellation scheme 400 that supports techniques for PAPR reduction in a DFT domain for wireless waveforms in accordance with examples as disclosed herein. The subband interference cancellation scheme 400 may implement or be implemented to realize aspects of the wireless communications system 100 or the wireless communications system 200. For example, a transmitting device, such as a UE 115 or a base station 105 as illustrated by and described with reference to FIGS. 1 and 2, may employ the subband interference cancellation scheme 400 to extend implementation of DFT-domain processing (e.g., performance of a CFR function on TD samples in a subsampled IDFT TD) to subband interference cancellation.

As shown in the subband interference cancellation scheme 400, the transmitting device may obtain an initial signal $x_{in}$ and may pass the $x_{in}$ to a state expander 405 (which may use or may otherwise be associated with non-linear terms) and a summation function 430. The state expander 405 may output to a multiplication function 410 with which the transmitting device may compute a product of the output of the state expander 405 and $W_k$, where $W_k$ may refer to memoryless power amplifier kernels that may be normalized to a linear term. In some aspects, the transmitting device may generate $W_k$ from a behavior model. The multiplication function 410 may output to an FFT function 415 (e.g., which may be an example of a TD to FD transform). In some aspects, the transmitting device may use an output of the FFT function 415 to model nonlinear behavior associated with the signal (e.g., both in-band and OOB). For example, as a result of performing an FFT in accordance with the FFT function 415, the transmitting device may identify power amplifier nonlinear behavior OOB and power amplifier nonlinear behavior in-band.

The FFT function 415 may output to a FD weighting function 420 according to which the transmitting device may weight the power amplifier nonlinearity (e.g., for one or both of the OOB nonlinearity and the in-band nonlinearity). In some aspects, the transmitting device may weight the power amplifier nonlinearity using the FD weighting function 420 such that the OOB nonlinearity is weighted by 1.5× and the in-band nonlinearity is weighted by 1×. Accordingly, in some examples, the FD weighting function 420 may be associated with weightings for the in-band nonlinearity and the OOB nonlinearity that are different from each other.

Further, the FD weighting function 420 may focus on the subband frequencies that are approximately 1.5× of an allocated bandwidth on either side of the in-band portion. Further, for EVM reduction, the transmitting device also may employ the FD weighting function 420 to apply to the in-band portion. As such, an output of the FD weighting function 420 may include weighted subband nonlinearity.

The FD weighting function 420 may output to an IFFT function 425 (e.g., an FD to TD transform). In some aspects, the transmitting device may perform operations or computations associated with the FFT function 415, the FD weighting function 420, and the IFFT function 425 using a filter, such as a finite impulse response (FIR) filter, in a modem of the transmitting device. In some implementations, the FFT function 415 and the IFFT function 425 may both have sizes based on an actual resource allocation for the signal to be transmitted by the transmitting device or may have sizes that are otherwise not full-sized (e.g., less than 4k or 4096).

The IFFT function 425 may output $x_{SB}$ to the summation function 430. The UE 115 may use the summation function 430 to subtract $x_{SB}$ from $x_{in}$. Such a subtraction of $x_{SB}$ from $x_{in}$ may result in or otherwise be associated with subband interference cancellation. As such, the summation function 430 may output $x_{SBIC}$ to a power amplifier 435 and the transmitting device may use the power amplifier 435 to generate a signal y. The transmitting device may transmit the signal y accordingly.

Figure 5:
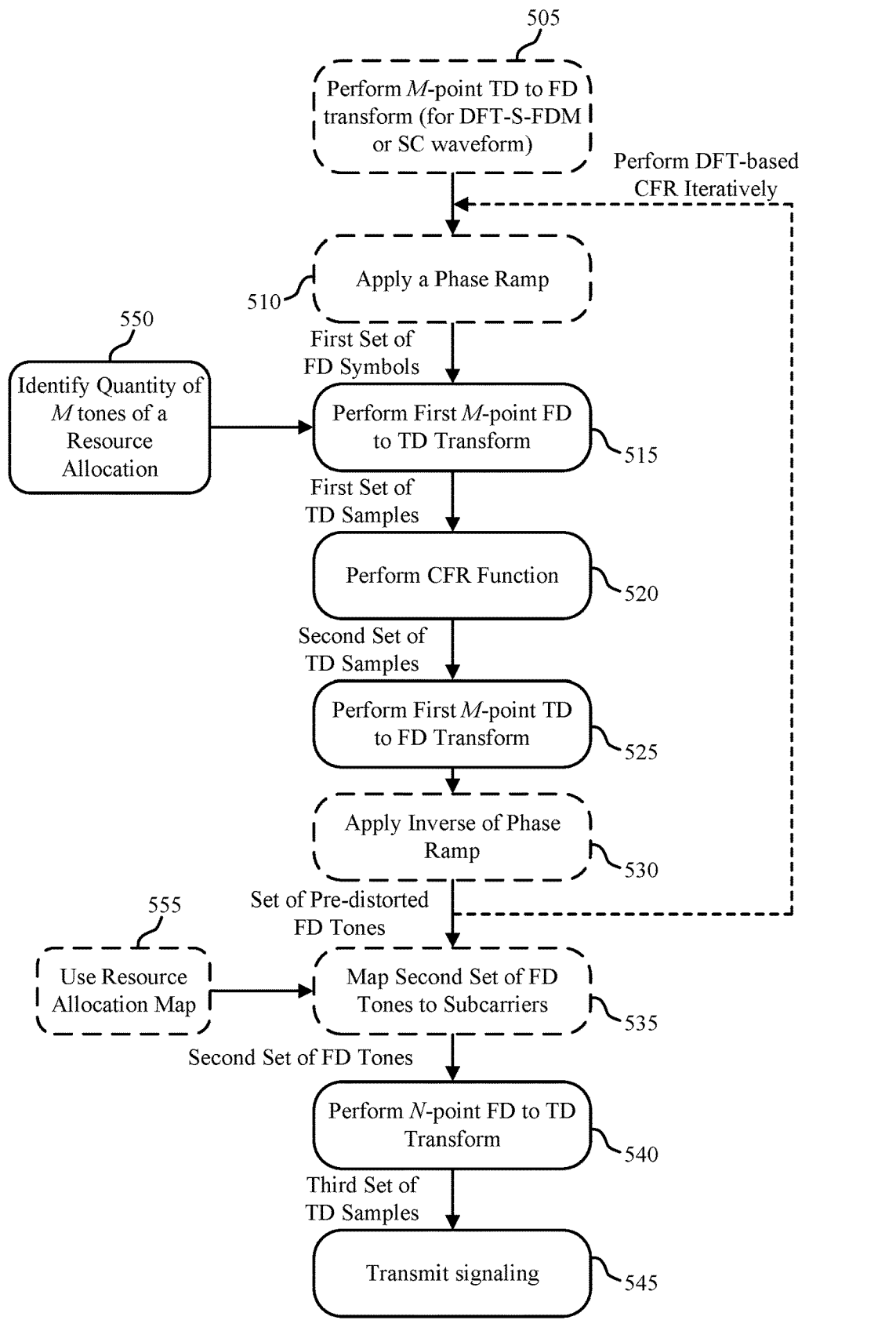
FIG. 5 illustrates an example of a process flow that supports techniques for PAPR reduction in a DFT domain for wireless waveforms in accordance with examples as disclosed herein.

FIG. 5 illustrates an example of a process flow 500 that supports techniques for PAPR reduction in a DFT domain for wireless waveforms in accordance with examples as disclosed herein. The process flow 500 may implement or be implemented to realize aspects of the wireless communications system 100 or the wireless communications system 200. For example, the process flow 500 may illustrate operations performed by a transmitting device, such as a UE 115 or a base station 105 as illustrated by and described with reference to FIGS. 1 and 2, to apply some pre-distortion on signaling on a set of allocated RBs using DFT-domain processing.

In the following description of the process flow 500, the operations may be performed (such as reported or provided) in a different order than the order shown, or the operations performed by the example devices may be performed in different orders or at different times. Some operations also may be left out of the process flow 500, or other operations may be added to the process flow 500. Further, although some operations or signaling may be shown to occur at different times for discussion purposes, these operations may actually occur at the same time.

At 505, the transmitting device may perform an M-point TD to FD transform for some waveform types. For example, the transmitting device may perform the M-point TD to FD transform for DFT-S-FDM or SC waveforms and may refrain from performing the M-point TD to FD transform for OFDM waveforms.

At 510, the transmitting device may, in some implementations, apply a first phase ramp to a first set of FD tones associated with the signaling. In some aspects, the first phase ramp may be associated with a TD shift, such as a TD shift by a fractional sample offset. In some implementations, the transmitting device may apply the first phase ramp for some waveform types, such as TD waveform types (e.g., for a DFT-S-FDM waveform type or an SC waveform type). In such implementations, the transmitting device also may transform a set of initial TD samples or modulation symbols associated with the signaling (e.g., associated with the TD waveform of the signaling) into the first set of FD tones at 505. In some other implementations, such as in implementations in which the transmitting device applies the first phase ramp to an OFDM waveform, the first set of FD tones may be associated with the OFDM waveform initially and the transmitting device may refrain from performing the M-point TD to FD transform to obtain the first set of FD tones at 505.

At 550, the transmitting device may identify a resource allocation for the signaling. In some aspects, the resource allocation may be associated with a quantity of FD tones, RBs, subcarriers, or any combination thereof. For example, the transmitting device may identify a quantity of M FD tones (such as of M continuous FD tones) of the resource allocation to cover a set of allocated RBs.

At 515, the transmitting device may perform a first M-point FD to TD transform on the first set of FD tones to obtain a first set of TD samples. In some examples, the first M-point FD to TD transform may be associated with a first transform size (such as a size M) that is based on the resource allocation associated with the signaling. For example, the transmitting device may use the resource allocation identified at 550 to inform on the first transform size for the first M-point FD to TD transform. In some aspects, the first M-point FD to TD transform may be an example of a first IDFT/IFFT and may be associated with a subsampled IDFT TD (e.g., as opposed to a fully-sampled signal domain, such as may be associated with a 4096-sized DFT/FFT). In some implementations, the transmitting device may determine a power amplifier nonlinearity using the first set of TD samples.

At 520, the transmitting device may perform a CFR function on the first set of TD samples to obtain a second set of TD samples. In some examples, the CFR function may include a clipping function or a companding function, or both, or any other PAPR reduction function scheme. In some examples, the transmitting device may perform the CFR function in the subsampled IDFT TD to fold (at least partially) a pre-distortion associated with the CFR function onto the resource allocation associated with the signaling to reduce a PAPR associated with the signaling while mitigating contributions to an OOB emission or ACLR. In some examples, "folding" the pre-distortion onto the resource allocation associated with the signaling may include allocating energy associated with the pre-distortion to one or more resources within the resource allocation associated with the signaling. In some implementations, the transmitting device may determine a residual error associated with performing the CFR function on the first set of TD samples. In some implementations, the transmitting device may perform the CFR function in accordance with an interference pattern (e.g., a model of a channel between the transmitting device and a receiver) associated with simultaneous transmission from each of multiple antennas at the transmitting device such that an expected EVM or SNR at a receiver satisfies a threshold EVM or SNR.

At 525, the transmitting device may perform a first M-point TD to FD transform on the second set of TD samples to obtain a second set of FD tones. In some examples, the transmitting device may perform the first M-point TD to FD transform to get the pre-distorted samples back into the FD for reversing an applied first phase ramp or mapping the pre-distorted signal to a set of subcarriers. As such, the transmitting device may pre-distort the signaling and convert back to the FD without going outside of or exceeding the resource allocation for the signaling (e.g., without using a full 4k DFT/FFT). In some aspects, the first M-point TD to FD transform may be associated with a first DFT/IFFT and may have a same size as the first M-point FD to TD transform (e.g., a size based on the resource allocation for the signaling). In some implementations, the transmitting device may perform subband interference cancellation on the second set of FD tones based on the amplifier nonlinearity.

At 530, for example, the transmitting device may, in some implementations, apply an inverse of the first phase ramp (e.g., an inverse of the first phase ramp applied at 510) to remove the TD shift associated with the first phase ramp and to obtain a set of pre-distorted tones (which may be an M-point set of pre-distorted tones). In some other implementations, the transmitting device may refrain from removing the first phase ramp. In such implementations, the transmitting device may expect a receiver to assume an additional channel delay equivalent to the TD offset associated with the first phase ramp.

In some implementations, the transmitting device may perform the described DFT-based CFR iteratively. For example, the transmitting device may perform phase ramps, perform M-point FD to TD transforms, perform CFR functions, perform M-point TD to FD transforms, and apply inverses of the performed phase ramps iteratively two or more times to reduce the PAPR associated with the signaling at two or more different TD offsets. For instance, the transmitting device may perform a second phase ramp (after performing an inverse of a first phase ramp), an M-point FD to TD transform, a second CFR function, an M-point TD to FD transform, and an inverse of the second phase ramp. As such, the transmitting device may take an iterative approach and may perform DFT-domain processing (e.g., may perform CFR functions in a subsampled IDFT TD) using multiple different time offsets or sample shifts.

At 535, the transmitting device may, in some implementations, map the set of pre-distorted FD tones to a set of subcarriers to obtain a second set of FD tones (which may be an N-point, or full FFT size, second set of FD tones). In some examples, the set of subcarriers may be based on the resource allocation for the signaling. In some implementations, such as in implementations in which the resource allocation for the signaling includes multiple sets of non-contiguous resources, the first transform size may be based on the multiple sets of non-contiguous resources including one or more null or empty resources between the multiple sets of non-contiguous resources and the transmitting device may apply, prior to a performing a second FD to TD transform, an energy reduction scheme on a portion of the second set of FD tones associated with the one or more null resources between the multiple sets of non-contiguous resources.

At 555, in some aspects, the transmitting device may use a resource allocation map to map the second set of FD tones to the set of subcarriers.

At 540, the transmitting device may perform an N-point (e.g., a second) FD to TD transform on the second set of FD tones to obtain a third set of TD samples. In some examples, the N-point FD to TD transform may have a second transform size that is larger than the first transform size. For example, the N-point FD to TD transform may be associated with a second IDFT/IFFT and may be an example of a fully-sampled or full-size IDFT/IFFT. In some aspects, such a fully-sampled or full-sized IDFT/IFFT may be associated with a quantity of subcarriers of a carrier or bandwidth part (as opposed to a size that is based on the resource allocation for the signaling within the carrier or bandwidth part).

Accordingly, at 545, the transmitting device may transmit the signaling based on the third set of TD samples. The transmitting device may transmit the signaling to a receiver over-the-air via an OFDM-based waveform or a TD waveform. In some implementations, the transmitting device may distribute the residual error across a frequency band associated with the signaling based on an EVM and an OOB emission associated with the signaling.

Figure 6:
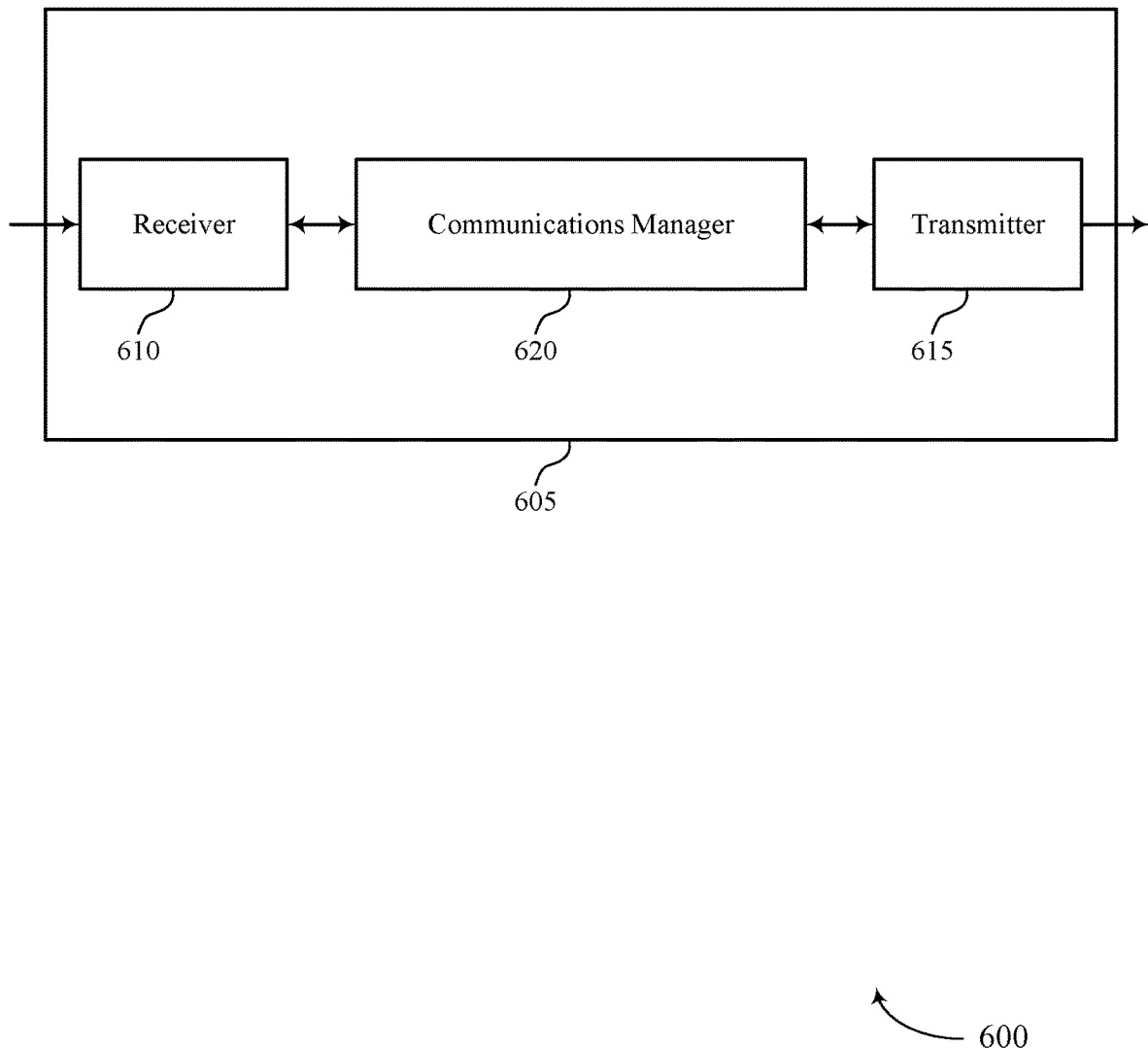
FIGS. 6 and 7 show block diagrams of devices that support techniques for PAPR reduction in a DFT domain for wireless waveforms in accordance with examples as disclosed herein.

FIG. 6 shows a block diagram 600 of a device 605 that supports techniques for PAPR reduction in a DFT domain for wireless waveforms in accordance with examples as disclosed herein. The device 605 may be an example of aspects of a UE 115 or a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for PAPR reduction in a DFT domain for wireless waveforms). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for PAPR reduction in a DFT domain for wireless waveforms). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for PAPR reduction in a DFT domain for wireless waveforms as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a device in accordance with examples as disclosed herein. For example, the communications manager 620 may be configured as or otherwise support a means for performing a first FD to TD transform on a first set of FD tones to obtain a first set of TD samples, where the first FD to TD transform has a first transform size. The communications manager 620 may be configured as or otherwise support a means for performing a crest factor reduction function on the first set of TD samples to obtain a second set of TD samples. The communications manager 620 may be configured as or otherwise support a means for performing a first TD to FD transform on the second set of TD samples to obtain a pre-distorted set of FD tones. The communications manager 620 may be configured as or otherwise support a means for mapping the pre-distorted set of FD tones to at least a portion of a second set of FD tones, where the second set of FD tones is larger than the first set of FD tones. The communications manager 620 may be configured as or otherwise support a means for performing a second FD to TD transform on the second set of FD tones to obtain a third set of TD samples, where the second FD to TD transform has a second transform size that is larger than the first transform size. The communications manager 620 may be configured as or otherwise support a means for transmitting signaling based on the third set of TD samples.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced processing, reduced power consumption, and more efficient utilization of communication resources.

Figure 7:
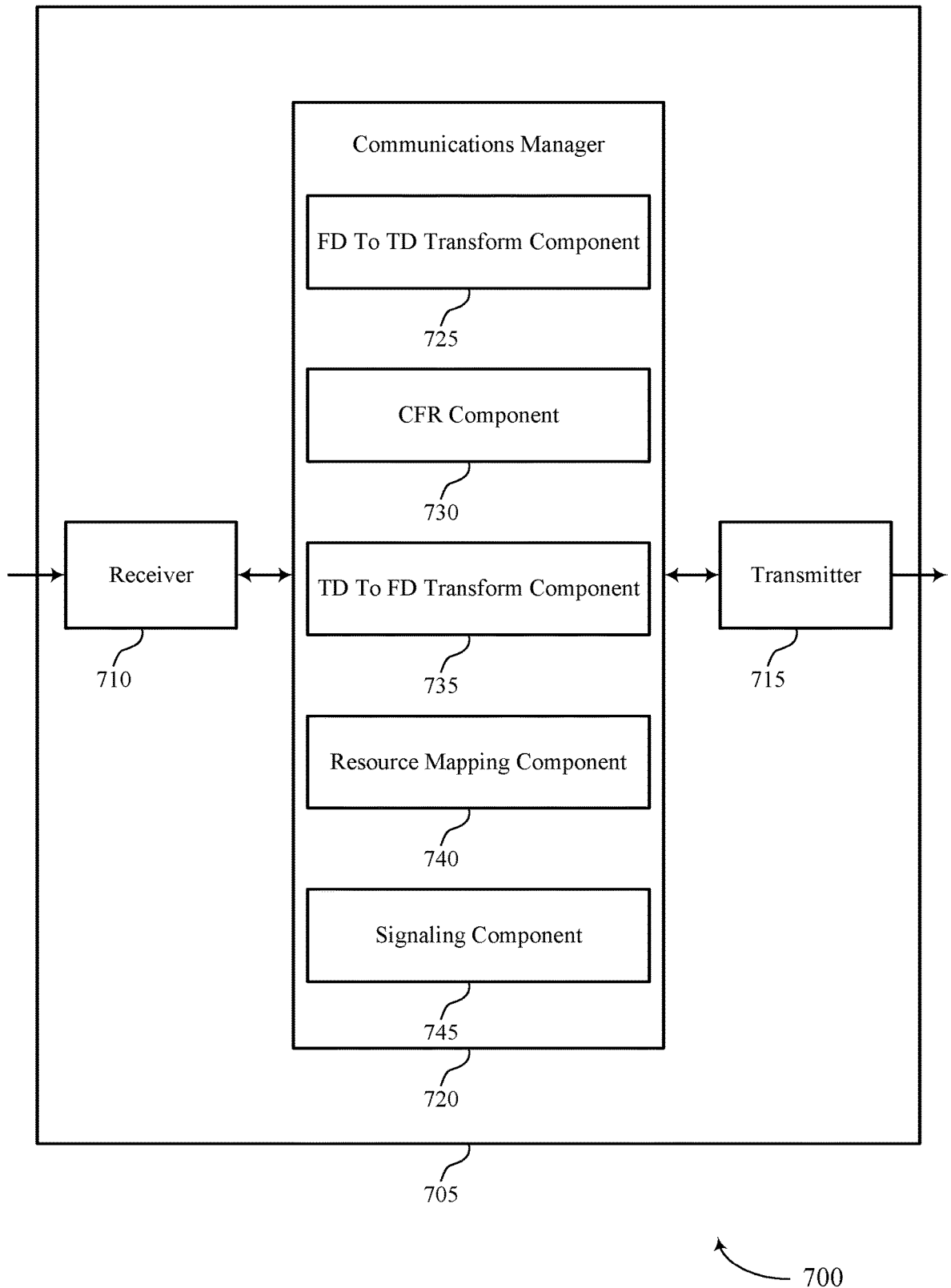

FIG. 7 shows a block diagram 700 of a device 705 that supports techniques for PAPR reduction in a DFT domain for wireless waveforms in accordance with aspects of the present disclosure. The device 705 may be an example of aspects of a device 605, a UE 115, or a base station 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for PAPR reduction in a DFT domain for wireless waveforms). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for PAPR reduction in a DFT domain for wireless waveforms). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for PAPR reduction in a DFT domain for wireless waveforms as described herein. For example, the communications manager 720 may include an FD to TD transform component 725, an CFR component 730, a TD to FD transform component 735, a resource mapping component 740, a signaling component 745, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a device in accordance with examples as disclosed herein. The FD to TD transform component 725 may be configured as or otherwise support a means for performing a first FD to TD transform on a first set of FD tones to obtain a first set of TD samples, where the first FD to TD transform has a first transform size. The CFR component 730 may be configured as or otherwise support a means for performing a crest factor reduction function on the first set of TD samples to obtain a second set of TD samples. The TD to FD transform component 735 may be configured as or otherwise support a means for performing a first TD to FD transform on the second set of TD samples to obtain a pre-distorted set of FD tones. The resource mapping component 740 may be configured as or otherwise support a means for mapping the pre-distorted set of FD tones to at least a portion of a second set of FD tones, where the second set of FD tones is larger than the first set of FD tones. The FD to TD transform component 725 may be configured as or otherwise support a means for performing a second FD to TD transform on the second set of FD tones to obtain a third set of TD samples, where the second FD to TD transform has a second transform size that is larger than the first transform size. The signaling component 745 may be configured as or otherwise support a means for transmitting signaling based on the third set of TD samples.

Figure 8:
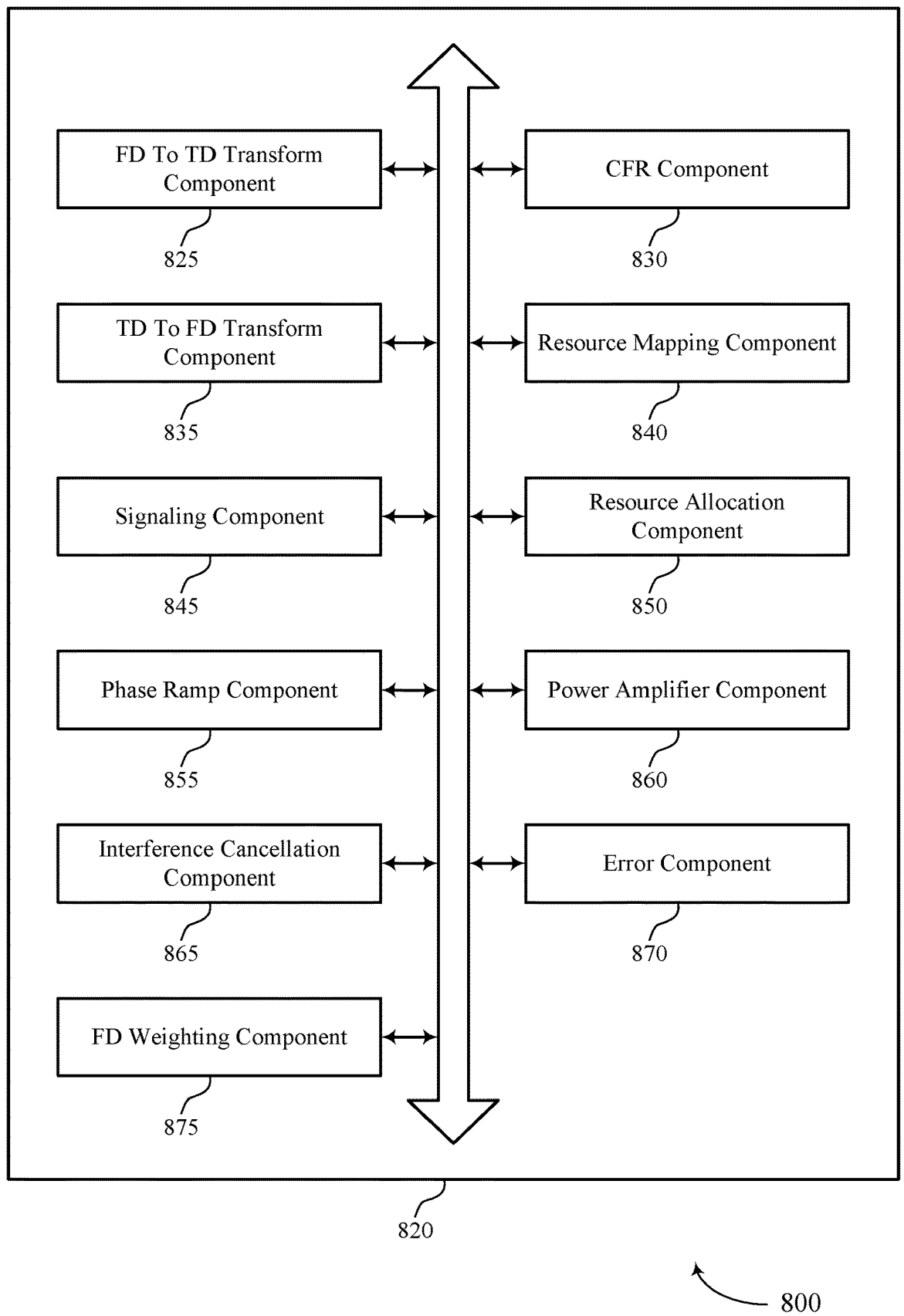
FIG. 8 shows a block diagram of a communications manager that supports techniques for PAPR reduction in a DFT domain for wireless waveforms in accordance with examples as disclosed herein.

FIG. 8 shows a block diagram 800 of a communications manager 820 that supports techniques for PAPR reduction in a DFT domain for wireless waveforms in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for PAPR reduction in a DFT domain for wireless waveforms as described herein. For example, the communications manager 820 may include an FD to TD transform component 825, an CFR component 830, a TD to FD transform component 835, a resource mapping component 840, a signaling component 845, a resource allocation component 850, a phase ramp component 855, a power amplifier component 860, an interference cancellation component 865, an error component 870, an FD weighting component 875, or any combination thereof. Each of these components may communicate, directly or indirectly, with one another (e.g., via one or more buses).

The communications manager 820 may support wireless communication at a device in accordance with examples as disclosed herein. The FD to TD transform component 825 may be configured as or otherwise support a means for performing a first FD to TD transform on a first set of FD tones to obtain a first set of TD samples, where the first FD to TD transform has a first transform size. The CFR component 830 may be configured as or otherwise support a means for performing a crest factor reduction function on the first set of TD samples to obtain a second set of TD samples. The TD to FD transform component 835 may be configured as or otherwise support a means for performing a first TD to FD transform on the second set of TD samples to obtain a pre-distorted set of FD tones. The resource mapping component 840 may be configured as or otherwise support a means for mapping the pre-distorted set of FD tones to at least a portion of a second set of FD tones, where the second set of FD tones is larger than the first set of FD tones. In some examples, the FD to TD transform component 825 may be configured as or otherwise support a means for performing a second FD to TD transform on the second set of FD tones to obtain a third set of TD samples, where the second FD to TD transform has a second transform size that is larger than the first transform size. The signaling component 845 may be configured as or otherwise support a means for transmitting signaling based on the third set of TD samples.

In some examples, the resource allocation component 850 may be configured as or otherwise support a means for identifying a resource allocation for the signaling, the resource allocation associated with a quantity of FD tones, where the first transform size of the first FD to TD transform is based on the quantity of FD tones.

In some examples, to support mapping the pre-distorted set of FD tones to at least the portion of the second set of FD tones, the resource mapping component 840 may be configured as or otherwise support a means for mapping the pre-distorted set of FD tones to a set of subcarriers, the set of subcarriers based on a resource allocation for the signaling, where performing the second FD to TD transform on the second set of FD tones is based on mapping the pre-distorted set of FD tones to the set of subcarriers.

In some examples, the phase ramp component 855 may be configured as or otherwise support a means for applying a first phase ramp to the first set of FD tones to obtain a phase-ramped set of FD tones, the first phase ramp corresponded to a first TD shift for the first set of TD samples, where performing the first FD to TD transform includes performing the first FD to TD transform on the phase-ramped set of FD tones. In some examples, the FD to TD transform component 825 may be configured as or otherwise support a means for performing, after applying the first phase ramp to the first set of FD tones, a third FD to TD transform on an initial set of FD tones to obtain the first set of TD samples.

In some examples, the phase ramp component 855 may be configured as or otherwise support a means for applying an inverse of the first phase ramp to the pre-distorted set of FD tones to remove the first TD shift and to obtain a first pre-distorted set of FD tones, where transmitting the signaling is based on applying the inverse of the first phase ramp to the pre-distorted set of FD tones to remove the first TD shift.

In some examples, the phase ramp component 855 may be configured as or otherwise support a means for applying a second phase ramp to the first pre-distorted set of FD tones to obtain a second phase-ramped set of FD tones, the second phase ramp associated with a second TD shift for the first set of TD samples. In some examples, the FD to TD transform component 825 may be configured as or otherwise support a means for performing a third FD to TD transform on the second phase-ramped set of FD tones to obtain a fourth set of TD samples. In some examples, the CFR component 830 may be configured as or otherwise support a means for performing a second crest factor reduction function on the fourth set of TD samples to obtain a fifth set of TD samples. In some examples, the TD to FD transform component 835 may be configured as or otherwise support a means for performing a third TD to FD transform on the fifth set of TD samples to obtain a third set of FD tones. In some examples, the phase ramp component 855 may be configured as or otherwise support a means for applying an inverse to the second phase ramp on the third set of FD tones to remove the second TD shift and to obtain a second pre-distorted set of FD tones, where mapping the pre-distorted set of FD tones to the second set of FD tones includes mapping the second pre-distorted set of FD tones to the second set of FD tones.

In some examples, the power amplifier component 860 may be configured as or otherwise support a means for determining a power amplifier nonlinearity using the first set of TD samples. In some examples, the interference cancellation component 865 may be configured as or otherwise support a means for performing subband interference cancellation on the second set of FD tones based on the power amplifier nonlinearity, where transmitting the signaling is based on performing the subband interference cancellation.

In some examples, to support performing the subband interference cancellation, the TD to FD transform component 835 may be configured as or otherwise support a means for performing a second TD to FD transform on the power amplifier nonlinearity to obtain a FD power amplifier nonlinearity. In some examples, to support performing the subband interference cancellation, the power amplifier component 860 may be configured as or otherwise support a means for subtracting the FD power amplifier nonlinearity from the second set of FD tones.

In some examples, to support performing the subband interference cancellation, the FD weighting component 875 may be configured as or otherwise support a means for applying a FD weighting to the FD power amplifier nonlinearity prior to subtracting the FD power amplifier nonlinearity from the second set of FD tones.

In some examples, the power amplifier component 860 may be configured as or otherwise support a means for determining the FD power amplifier nonlinearity across a first set of frequency resources corresponding to a resource allocation associated with the signaling and a second set of resources external to the resource allocation associated with the signaling.

In some examples, a resource allocation associated with the signaling includes multiple sets of non-contiguous resources and the first transform size is based on a size of the multiple sets of non-contiguous resources including one or more null resources between the multiple sets of non-contiguous resources, and the interference cancellation component 865 may be configured as or otherwise support a means for applying, prior to performing the second FD to TD transform, an energy reduction scheme on a portion of the second set of FD tones associated with the one or more null resources between the multiple sets of non-contiguous resources.

In some examples, the error component 870 may be configured as or otherwise support a means for determining a residual error associated with performing the crest factor reduction function on the first set of TD samples. In some examples, the error component 870 may be configured as or otherwise support a means for distributing the residual error across a frequency band associated with the signaling based on an error vector magnitude and an out-of-band emission associated with the signaling, where transmitting the signaling is based on distributing the residual error across the frequency band.

In some examples, to support distributing the residual error across the frequency band, the error component 870 may be configured as or otherwise support a means for allocating energy associated with the residual error to at least a subset of FD resources in the frequency band in accordance with a configured pattern.

In some examples, to support performing the crest factor reduction function, the CFR component 830 may be configured as or otherwise support a means for performing the crest factor reduction function in accordance with an interference pattern associated with simultaneous transmissions from each of multiple antennas at the device such that an expected error vector magnitude at a receiver satisfies a threshold error vector magnitude and while suppressing out of band emission.

Figure 9:
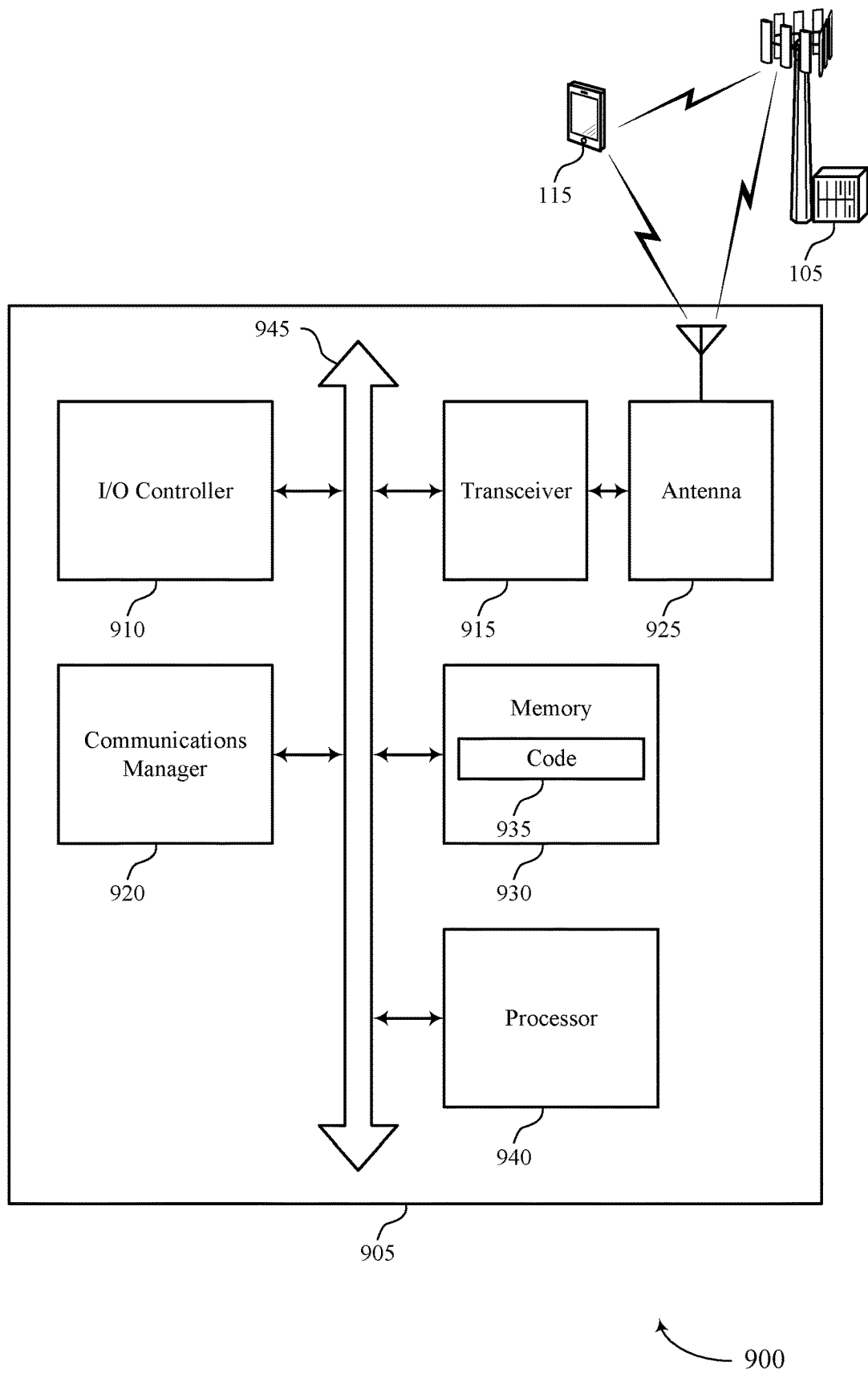
FIG. 9 shows a diagram of a system including a UE that supports techniques for PAPR reduction in a DFT domain for wireless waveforms in accordance with examples as disclosed herein.

FIG. 9 shows a diagram of a system 900 including a device 905 that supports techniques for PAPR reduction in a DFT domain for wireless waveforms in accordance with examples as disclosed herein. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for PAPR reduction in a DFT domain for wireless waveforms). For example, the device 905 or a component of the device 905 may include a processor 940 and memory 930 coupled with the processor 940, the processor 940 and memory 930 configured to perform various functions described herein.

The communications manager 920 may support wireless communication at a device in accordance with examples as disclosed herein. For example, the communications manager 920 may be configured as or otherwise support a means for performing a first FD to TD transform on a first set of FD tones to obtain a first set of TD samples, where the first FD to TD transform has a first transform size. The communications manager 920 may be configured as or otherwise support a means for performing a crest factor reduction function on the first set of TD samples to obtain a second set of TD samples. The communications manager 920 may be configured as or otherwise support a means for performing a first TD to FD transform on the second set of TD samples to obtain a pre-distorted set of FD tones. The communications manager 920 may be configured as or otherwise support a means for mapping the pre-distorted set of FD tones to at least a portion of a second set of FD tones, where the second set of FD tones is larger than the first set of FD tones. The communications manager 920 may be configured as or otherwise support a means for performing a second FD to TD transform on the second set of FD tones to obtain a third set of TD samples, where the second FD to TD transform has a second transform size that is larger than the first transform size. The communications manager 920 may be configured as or otherwise support a means for transmitting signaling based on the third set of TD samples.

By including or configuring the communications manager 920 in accordance with examples as described herein, the device 905 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for PAPR reduction in a DFT domain for wireless waveforms as described herein, or the processor 940 and the memory 930 may be otherwise configured to perform or support such operations.

Figure 10:
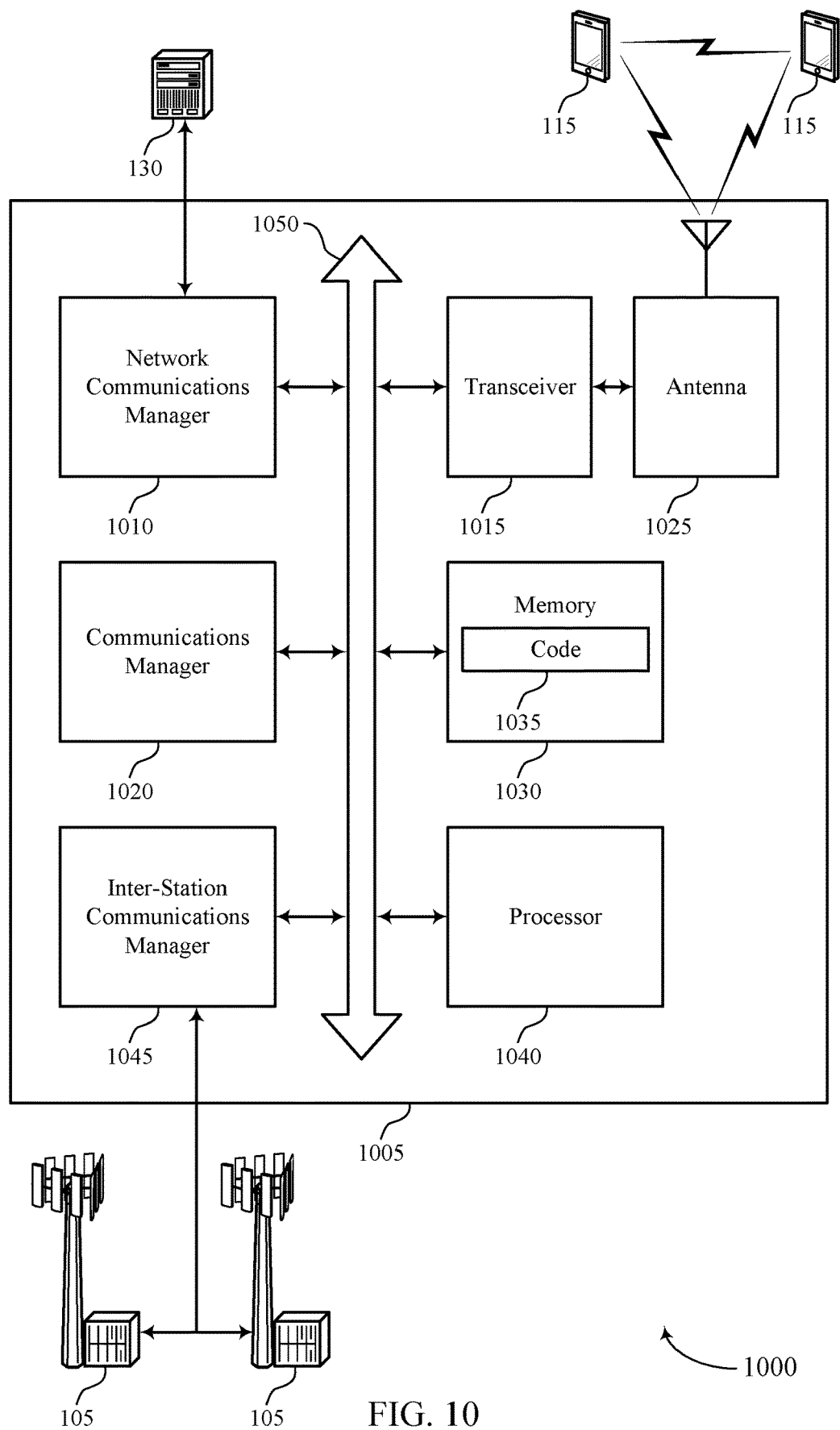
FIG. 10 shows a diagram of a system including a base station that supports techniques for PAPR reduction in a DFT domain for wireless waveforms in accordance with examples as disclosed herein.

FIG. 10 shows a diagram of a system 1000 including a device 1005 that supports techniques for PAPR reduction in a DFT domain for wireless waveforms in accordance with examples as disclosed herein. The device 1005 may be an example of or include the components of a device 605, a device 705, or a base station 105 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, a network communications manager 1010, a transceiver 1015, an antenna 1025, a memory 1030, code 1035, a processor 1040, and an inter-station communications manager 1045. These components may be in electronic communication or otherwise coupled (e.g., operatively, communicatively, functionally, electronically, electrically) via one or more buses (e.g., a bus 1050).

The network communications manager 1010 may manage communications with a core network 130 (e.g., via one or more wired backhaul links). For example, the network communications manager 1010 may manage the transfer of data communications for client devices, such as one or more UEs 115.

In some cases, the device 1005 may include a single antenna 1025. However, in some other cases the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 615, a transmitter 715, a receiver 610, a receiver 710, or any combination thereof or component thereof, as described herein.

The memory 1030 may include RAM and ROM. The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a BIOS which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for PAPR reduction in a DFT domain for wireless waveforms). For example, the device 1005 or a component of the device 1005 may include a processor 1040 and memory 1030 coupled with the processor 1040, the processor 1040 and memory 1030 configured to perform various functions described herein.

The inter-station communications manager 1045 may manage communications with other base stations 105, and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, the inter-station communications manager 1045 may provide an X2 interface within an LTE/LTE-A wireless communications network technology to provide communication between base stations 105.

The communications manager 1020 may support wireless communication at a device in accordance with examples as disclosed herein. For example, the communications manager 1020 may be configured as or otherwise support a means for performing a first FD to TD transform on a first set of FD tones to obtain a first set of TD samples, where the first FD to TD transform has a first transform size. The communications manager 1020 may be configured as or otherwise support a means for performing a crest factor reduction function on the first set of TD samples to obtain a second set of TD samples. The communications manager 1020 may be configured as or otherwise support a means for performing a first TD to FD transform on the second set of TD samples to obtain a pre-distorted set of FD tones. The communications manager 1020 may be configured as or otherwise support a means for mapping the pre-distorted set of FD tones to at least a portion of a second set of FD tones, where the second set of FD tones is larger than the first set of FD tones. The communications manager 1020 may be configured as or otherwise support a means for performing a second FD to TD transform on the second set of FD tones to obtain a third set of TD samples, where the second FD to TD transform has a second transform size that is larger than the first transform size. The communications manager 1020 may be configured as or otherwise support a means for transmitting signaling based on the third set of TD samples.

By including or configuring the communications manager 1020 in accordance with examples as described herein, the device 1005 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for PAPR reduction in a DFT domain for wireless waveforms as described herein, or the processor 1040 and the memory 1030 may be otherwise configured to perform or support such operations.

Figure 11:
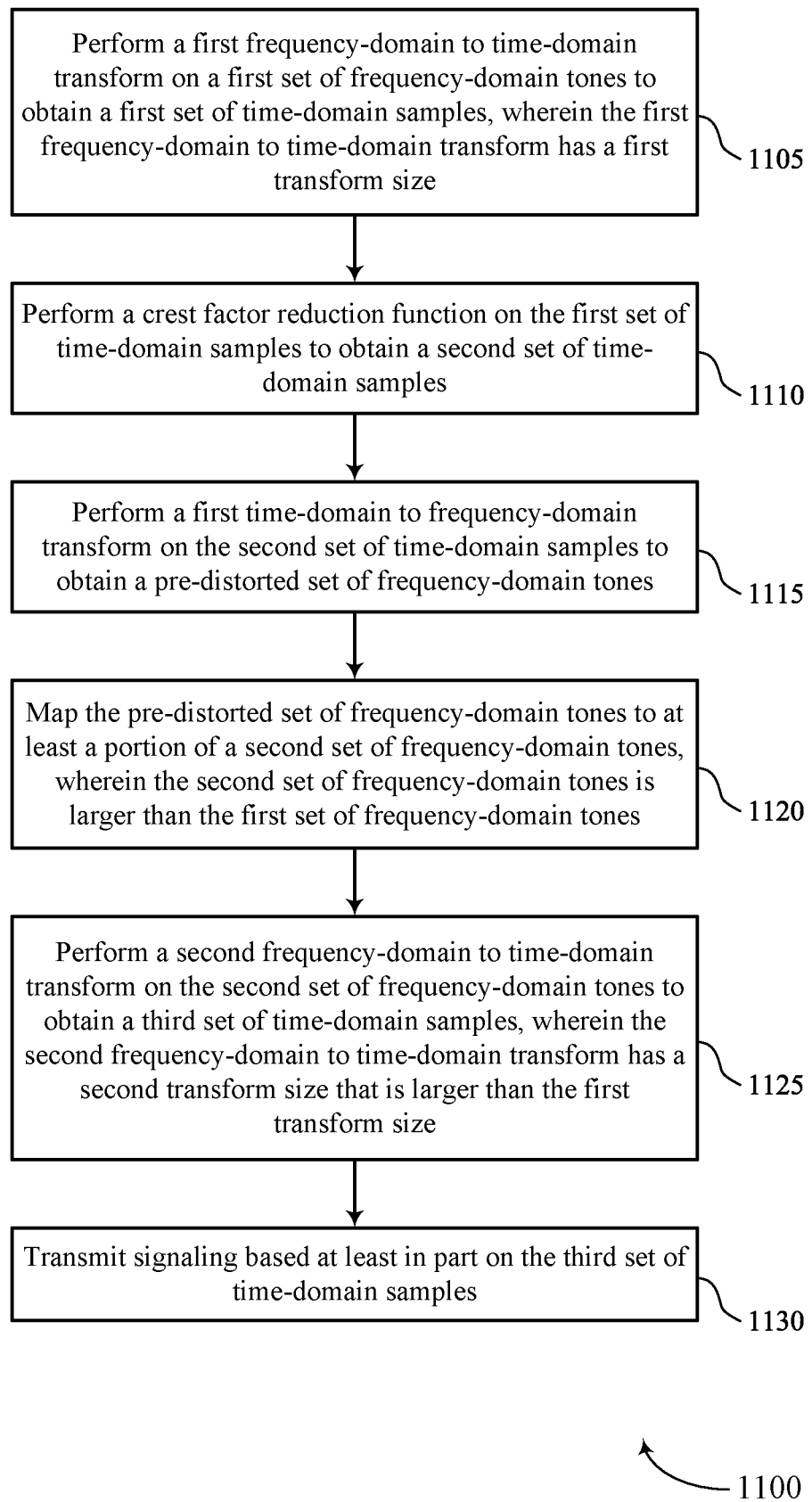
FIG. 11 shows a flowchart illustrating a method that supports techniques for PAPR reduction in a DFT domain for wireless waveforms in accordance with examples as disclosed herein.

FIG. 11 shows a flowchart illustrating a method 1100 that supports techniques for PAPR reduction in a DFT domain for wireless waveforms in accordance with examples as disclosed herein. The operations of the method 1100 may be implemented by a UE or a base station or its components as described herein. For example, the operations of the method 1100 may be performed by a UE 115 or a base station 105 as described with reference to FIGS. 1 through 10. In some examples, a UE or a base station may execute a set of instructions to control the functional elements of the UE or the base station to perform the described functions. Additionally or alternatively, the UE or the base station may perform aspects of the described functions using special-purpose hardware.

At 1105, the method may include performing a first FD to TD transform on a first set of FD tones to obtain a first set of TD samples, where the first FD to TD transform has a first transform size. The operations of 1105 may be performed in accordance with examples as disclosed herein. In some examples, aspects of the operations of 1105 may be performed by an FD to TD transform component 825 as described with reference to FIG. 8.

At 1110, the method may include performing a crest factor reduction function on the first set of TD samples to obtain a second set of TD samples. The operations of 1110 may be performed in accordance with examples as disclosed herein.

In some examples, aspects of the operations of 1110 may be performed by an CFR component 830 as described with reference to FIG. 8.

At 1115, the method may include performing a first TD to FD transform on the second set of TD samples to obtain a pre-distorted set of FD tones. The operations of 1115 may be performed in accordance with examples as disclosed herein. In some examples, aspects of the operations of 1115 may be performed by a TD to FD transform component 835 as described with reference to FIG. 8.

At 1120, the method may include mapping the pre-distorted set of FD tones to at least a portion of a second set of FD tones, where the second set of FD tones is larger than the first set of FD tones. The operations of 1120 may be performed in accordance with examples as disclosed herein. In some examples, aspects of the operations of 1120 may be performed by a resource mapping component 840 as described with reference to FIG. 8.

At 1125, the method may include performing a second FD to TD transform on the second set of FD tones to obtain a third set of TD samples, where the second FD to TD transform has a second transform size that is larger than the first transform size. The operations of 1125 may be performed in accordance with examples as disclosed herein. In some examples, aspects of the operations of 1125 may be performed by an FD to TD transform component 825 as described with reference to FIG. 8.

At 1130, the method may include transmitting signaling based on the third set of TD samples. The operations of 1130 may be performed in accordance with examples as disclosed herein. In some examples, aspects of the operations of 1130 may be performed by a signaling component 845 as described with reference to FIG. 8.

The following provides an overview of aspects of the present disclosure:

Aspect 1: A method for wireless communication at a device, comprising: performing a first FD to TD transform on a first set of FD tones to obtain a first set of TD samples, wherein the first FD to TD transform has a first transform size; performing a crest factor reduction function on the first set of TD samples to obtain a second set of TD samples; performing a first TD to FD transform on the second set of TD samples to obtain a pre-distorted set of FD tones; mapping the pre-distorted set of FD tones to at least a portion of a second set of FD tones, wherein the second set of FD tones is larger than the first set of FD tones; performing a second FD to TD transform on the second set of FD tones to obtain a third set of TD samples, wherein the second FD to TD transform has a second transform size that is larger than the first transform size; and transmitting signaling based at least in part on the third set of TD samples.

Aspect 2: The method of aspect 1, further comprising: identifying a resource allocation for the signaling, the resource allocation associated with a quantity of FD tones, wherein the first transform size of the first FD to TD transform is based at least in part on the quantity of FD tones.

Aspect 3: The method of any of aspects 1 or 2, wherein mapping the pre-distorted set of FD tones to at least the portion of the second set of FD tones comprises: mapping the pre-distorted set of FD tones to a set of subcarriers, the set of subcarriers based at least in part on a resource allocation for the signaling, wherein performing the second FD to TD transform on the second set of FD tones is based at least in part on mapping the pre-distorted set of FD tones to the set of subcarriers.

Aspect 4: The method of any of aspects 1 through 3, further comprising: applying a first phase ramp to the first set of FD tones to obtain a phase-ramped set of FD tones, the first phase ramp corresponded to a first TD shift for the first set of TD samples, wherein performing the first FD to TD transform comprises performing the first FD to TD transform on the phase-ramped set of FD tones; and performing, after applying the first phase ramp to the first set of FD tones, a third FD to TD transform on an initial set of FD tones to obtain the first set of TD samples.

Aspect 5: The method of aspect 4, further comprising: applying an inverse of the first phase ramp to the pre-distorted set of FD tones to remove the first TD shift and to obtain a first pre-distorted set of FD tones, wherein transmitting the signaling is based at least in part on applying the inverse of the first phase ramp to the pre-distorted set of FD tones to remove the first TD shift.

Aspect 6: The method of aspect 5, further comprising: applying a second phase ramp to the first pre-distorted set of FD tones to obtain a second phase-ramped set of FD tones, the second phase ramp associated with a second TD shift for the first set of TD samples; performing a third FD to TD transform on the second phase-ramped set of FD tones to obtain a fourth set of TD samples; performing a second crest factor reduction function on the fourth set of TD samples to obtain a fifth set of TD samples; performing a third TD to FD transform on the fifth set of TD samples to obtain a third set of FD tones; and applying an inverse to the second phase ramp on the third set of FD tones to remove the second TD shift and to obtain a second pre-distorted set of FD tones, wherein mapping the pre-distorted set of FD tones to the second set of FD tones comprises mapping the second pre-distorted set of FD tones to the second set of FD tones.

Aspect 7: The method of any of aspects 1 through 6, further comprising: determining a power amplifier nonlinearity using the first set of TD samples; and performing subband interference cancellation on the second set of FD tones based at least in part on the power amplifier nonlinearity, wherein transmitting the signaling is based at least in part on performing the subband interference cancellation.

Aspect 8: The method of aspect 7, wherein performing the subband interference cancellation comprises: performing a second TD to FD transform on the power amplifier nonlinearity to obtain a FD power amplifier nonlinearity; and subtracting the FD power amplifier nonlinearity from the second set of FD tones.

Aspect 9: The method of aspect 8, wherein performing the subband interference cancellation comprises: applying a FD weighting to the FD power amplifier nonlinearity prior to subtracting the FD power amplifier nonlinearity from the second set of FD tones.

Aspect 10: The method of any of aspects 8 or 9, further comprising: determining the FD power amplifier nonlinearity across a first set of frequency resources corresponding to a resource allocation associated with the signaling and a second set of resources external to the resource allocation associated with the signaling.

Aspect 11: The method of any of aspects 8 through 10, wherein a resource allocation associated with the signaling comprises multiple sets of non-contiguous resources and the first transform size is based at least in part on a size of the multiple sets of non-contiguous resources including one or more null resources between the multiple sets of non-contiguous resources, the method further comprising: applying, prior to performing the second FD to TD transform, an energy reduction scheme on a portion of the second set of FD tones associated with the one or more null resources between the multiple sets of non-contiguous resources.

Aspect 12: The method of any of aspects 1 through 11, further comprising: determining a residual error associated with performing the crest factor reduction function on the first set of TD samples; and distributing the residual error across a frequency band associated with the signaling based at least in part on an error vector magnitude and an out-of-band emission associated with the signaling, wherein transmitting the signaling is based at least in part on distributing the residual error across the frequency band.

Aspect 13: The method of aspect 12, wherein distributing the residual error across the frequency band comprises: allocating energy associated with the residual error to at least a subset of FD resources in the frequency band in accordance with a configured pattern.

Aspect 14: The method of any of aspects 1 through 13, wherein performing the crest factor reduction function comprises: performing the crest factor reduction function in accordance with an interference pattern associated with simultaneous transmissions from each of multiple antennas at the device such that an expected error vector magnitude at a receiver satisfies a threshold error vector magnitude and while suppressing OOB emission.

Aspect 15: An apparatus for wireless communication at a device, comprising a processor; memory coupled with the processor; and instructions stored in the memory and executable by the processor to cause the apparatus to perform a method of any of aspects 1 through 14.

Aspect 16: An apparatus for wireless communication at a device, comprising at least one means for performing a method of any of aspects 1 through 14.

Aspect 17: A non-transitory computer-readable medium storing code for wireless communication at a device, the code comprising instructions executable by a processor to perform a method of any of aspects 1 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a device, comprising:
    applying a first phase ramp to a first set of frequency-domain tones to obtain a phase-ramped set of frequency-domain tones;
    performing, subsequent to applying the first phase ramp to the first set of frequency-domain tones, a first frequency-domain to time-domain transform on the first set of frequency-domain tones to obtain a first set of time-domain samples, wherein the first frequency-domain to time-domain transform has a first transform size, wherein the first phase ramp corresponds to a first time-domain shift for the first set of time-domain samples, and wherein performing the first frequency-domain to time-domain transform comprises performing the first frequency-domain to time-domain transform on the phase-ramped set of frequency-domain tones;
    performing a crest factor reduction function on the first set of time-domain samples to obtain a second set of time-domain samples;
    performing a first time-domain to frequency-domain transform on the second set of time-domain samples to obtain a pre-distorted set of frequency-domain tones;
    applying an inverse of the first phase ramp to the pre-distorted set of frequency-domain tones to remove the first time-domain shift and to obtain a first pre-distorted set of frequency-domain tones;
    mapping the pre-distorted set of frequency-domain tones to at least a portion of a second set of frequency-domain tones, wherein the second set of frequency-domain tones is larger than the first set of frequency-domain tones;
    performing a second frequency-domain to time-domain transform on the second set of frequency-domain tones to obtain a third set of time-domain samples, wherein the second frequency-domain to time-domain transform has a second transform size that is larger than the first transform size; and
    transmitting signaling based at least in part on the third set of time-domain samples, wherein transmitting the signaling is based at least in part on applying the inverse of the first phase ramp to the pre-distorted set of frequency-domain tones to remove the first time-domain shift.

2. The method of claim 1, further comprising:
    identifying a resource allocation for the signaling, the resource allocation associated with a quantity of frequency-domain tones, wherein the first transform size of the first frequency-domain to time-domain transform is based at least in part on the quantity of frequency-domain tones.

3. The method of claim 1, wherein mapping the pre-distorted set of frequency-domain tones to at least the portion of the second set of frequency-domain tones comprises:
    mapping the pre-distorted set of frequency-domain tones to a set of subcarriers, the set of subcarriers based at least in part on a resource allocation for the signaling, wherein performing the second frequency-domain to time-domain transform on the second set of frequency-domain tones is based at least in part on mapping the pre-distorted set of frequency-domain tones to the set of subcarriers.

4. The method of claim 1, further comprising:
    applying a second phase ramp to the first pre-distorted set of frequency-domain tones to obtain a second phase-ramped set of frequency-domain tones, the second phase ramp associated with a second time-domain shift for the first set of time-domain samples;
    performing a third frequency-domain to time-domain transform on the second phase-ramped set of frequency-domain tones to obtain a fourth set of time-domain samples;
    performing a second crest factor reduction function on the fourth set of time-domain samples to obtain a fifth set of time-domain samples;
    performing a third time-domain to frequency-domain transform on the fifth set of time-domain samples to obtain a third set of frequency-domain tones; and
    applying an inverse to the second phase ramp on the third set of frequency-domain tones to remove the second time-domain shift and to obtain a second pre-distorted set of frequency-domain tones, wherein mapping the pre-distorted set of frequency-domain tones to the second set of frequency-domain tones comprises mapping the second pre-distorted set of frequency-domain tones to the second set of frequency-domain tones.

5. A method for wireless communication at a device, comprising:
    applying a first phase ramp to a first set of frequency-domain tones;

performing, subsequent to applying the first phase ramp to the first set of frequency-domain tones, a first frequency-domain to time-domain transform on the first set of frequency-domain tones to obtain a first set of time-domain samples, wherein the first frequency-domain to time-domain transform has a first transform size;

performing a crest factor reduction function on the first set of time-domain samples to obtain a second set of time-domain samples;

performing a first time-domain to frequency-domain transform on the second set of time-domain samples to obtain a pre-distorted set of frequency-domain tones;

mapping the pre-distorted set of frequency-domain tones to at least a portion of a second set of frequency-domain tones, wherein the second set of frequency-domain tones is larger than the first set of frequency-domain tones;

determining a power amplifier nonlinearity using the first set of time-domain samples;

performing subband interference cancellation on the second set of frequency-domain tones based at least in part on the power amplifier nonlinearity; and performing a second frequency-domain to time-domain transform on the second set of frequency-domain tones to obtain a third set of time-domain samples, wherein the second frequency-domain to time-domain transform has a second transform size that is larger than the first transform size; and transmitting signaling based at least in part on the third set of time-domain samples, wherein transmitting the signaling is based at least in part on performing the subband interference cancellation.

6. The method of claim 5, wherein performing the subband interference cancellation comprises:
performing a second time-domain to frequency-domain transform on the power amplifier nonlinearity to obtain a frequency-domain power amplifier nonlinearity; and
subtracting the frequency-domain power amplifier nonlinearity from the second set of frequency-domain tones.

7. The method of claim 6, wherein performing the subband interference cancellation comprises:
applying a frequency-domain weighting to the frequency-domain power amplifier nonlinearity prior to subtracting the frequency-domain power amplifier nonlinearity from the second set of frequency-domain tones.

8. The method of claim 6, further comprising:
determining the frequency-domain power amplifier nonlinearity across a first set of frequency resources corresponding to a resource allocation associated with the signaling and a second set of resources external to the resource allocation associated with the signaling.

9. The method of claim 6, wherein a resource allocation associated with the signaling comprises multiple sets of non-contiguous resources and the first transform size is based at least in part on a size of the multiple sets of non-contiguous resources including one or more null resources between the multiple sets of non-contiguous resources, the method further comprising:
applying, prior to performing the second frequency-domain to time-domain transform, an energy reduction scheme on a portion of the second set of frequency-domain tones associated with the one or more null resources between the multiple sets of non-contiguous resources.

10. The method of claim 1, further comprising:
determining a residual error associated with performing the crest factor reduction function on the first set of time-domain samples based at least in part on applying an inverse discrete Fourier transform function to a residual clipping associated with the crest factor reduction function on the first set of time-domain samples; and
distributing the residual error across a frequency band associated with the signaling based at least in part on an error vector magnitude and an out-of-band emission associated with the signaling, wherein transmitting the signaling is based at least in part on distributing the residual error across the frequency band.

11. The method of claim 10, wherein distributing the residual error across the frequency band comprises:
allocating energy associated with the residual error to at least a subset of frequency-domain resources in the frequency band in accordance with a configured pattern.

12. A method for wireless communication at a device, comprising:
applying a first phase ramp to a first set of frequency-domain tones;
performing, subsequent to applying the first phase ramp to the first set of frequency-domain tones, a first frequency-domain to time-domain transform on the first set of frequency-domain tones to obtain a first set of time-domain samples, wherein the first frequency-domain to time-domain transform has a first transform size;
performing a crest factor reduction function on the first set of time-domain samples to obtain a second set of time-domain samples in accordance with an interference pattern associated with simultaneous transmissions from each of multiple antennas at the device such that an expected error vector magnitude at a receiver satisfies a threshold error vector magnitude and while suppressing out of band emission;
performing a first time-domain to frequency-domain transform on the second set of time-domain samples to obtain a pre-distorted set of frequency-domain tones;
mapping the pre-distorted set of frequency-domain tones to at least a portion of a second set of frequency-domain tones, wherein the second set of frequency-domain tones is larger than the first set of frequency-domain tones;
performing a second frequency-domain to time-domain transform on the second set of frequency-domain tones to obtain a third set of time-domain samples, wherein the second frequency-domain to time-domain transform has a second transform size that is larger than the first transform size; and
transmitting signaling based at least in part on the third set of time-domain samples.

13. An apparatus for wireless communication at a device, comprising:
a processor;
memory coupled with the processor; and
instructions stored in the memory and executable by the processor to cause the apparatus to:
apply a first phase ramp to a first set of frequency-domain tones to obtain a phase-ramped set of frequency-domain tones;
perform, subsequent to applying the first phase ramp to the first set of frequency-domain tones, a first frequency-domain to time-domain transform on the first set of frequency-domain tones to obtain a first set of time-domain samples, wherein the first frequency-domain to time-domain transform has a first transform size, wherein the first phase ramp corresponds to a first time-domain shift for the first set of time-domain samples, and wherein performing the first frequency-domain to time-domain transform comprises performing the first frequency-domain to time-domain transform on the phase-ramped set of frequency-domain tones;

perform a crest factor reduction function on the first set of time-domain samples to obtain a second set of time-domain samples;

perform a first time-domain to frequency-domain transform on the second set of time-domain samples to obtain a pre-distorted set of frequency-domain tones;

apply an inverse of the first phase ramp to the pre-distorted set of frequency-domain tones to remove the first time-domain shift and to obtain a first pre-distorted set of frequency-domain tones;

map the pre-distorted set of frequency-domain tones to at least a portion of a second set of frequency-domain tones, wherein the second set of frequency-domain tones is larger than the first set of frequency-domain tones;

perform a second frequency-domain to time-domain transform on the second set of frequency-domain tones to obtain a third set of time-domain samples, wherein the second frequency-domain to time-domain transform has a second transform size that is larger than the first transform size; and transmit signaling based at least in part on the third set of time-domain samples, wherein transmitting the signaling is based at least in part on applying the inverse of the first phase ramp to the pre-distorted set of frequency-domain tones to remove the first time-domain shift.

14. The apparatus of claim 13, wherein the instructions are further executable by the processor to cause the apparatus to:
identify a resource allocation for the signaling, the resource allocation associated with a quantity of frequency-domain tones, wherein the first transform size of the first frequency-domain to time-domain transform is based at least in part on the quantity of frequency-domain tones.

15. The apparatus of claim 13, wherein the instructions to map the pre-distorted set of frequency-domain tones to at least the portion of the second set of frequency-domain tones are executable by the processor to cause the apparatus to:
map the pre-distorted set of frequency-domain tones to a set of subcarriers, the set of subcarriers based at least in part on a resource allocation for the signaling, wherein performing the second frequency-domain to time-domain transform on the second set of frequency-domain tones is based at least in part on mapping the pre-distorted set of frequency-domain tones to the set of subcarriers.

16. The apparatus of claim 13, wherein the instructions are further executable by the processor to cause the apparatus to:
apply a second phase ramp to the first pre-distorted set of frequency-domain tones to obtain a second phase-ramped set of frequency-domain tones, the second phase ramp associated with a second time-domain shift for the first set of time-domain samples;

perform a third frequency-domain to time-domain transform on the second phase-ramped set of frequency-domain tones to obtain a fourth set of time-domain samples;

perform a second crest factor reduction function on the fourth set of time-domain samples to obtain a fifth set of time-domain samples;

perform a third time-domain to frequency-domain transform on the fifth set of time-domain samples to obtain a third set of frequency-domain tones; and apply an inverse to the second phase ramp on the third set of frequency-domain tones to remove the second time-domain shift and to obtain a second pre-distorted set of frequency-domain tones, wherein mapping the pre-distorted set of frequency-domain tones to the second set of frequency-domain tones comprises mapping the second pre-distorted set of frequency-domain tones to the second set of frequency-domain tones.

17. An apparatus for wireless communication at a device, comprising:
a processor;
memory coupled with the processor; and
instructions stored in the memory and executable by the processor to cause the apparatus to:
apply a first phase ramp to a first set of frequency-domain tones;

perform, subsequent to applying the first phase ramp to the first set of frequency-domain tones, a first frequency-domain to time-domain transform on the first set of frequency-domain tones to obtain a first set of time-domain samples, wherein the first frequency-domain to time-domain transform has a first transform size;

perform a crest factor reduction function on the first set of time-domain samples to obtain a second set of time-domain samples;

perform a first time-domain to frequency-domain transform on the second set of time-domain samples to obtain a pre-distorted set of frequency-domain tones;

map the pre-distorted set of frequency-domain tones to at least a portion of a second set of frequency-domain tones, wherein the second set of frequency-domain tones is larger than the first set of frequency-domain tones;

determine a power amplifier nonlinearity using the first set of time-domain samples;

perform subband interference cancellation on the second set of frequency-domain tones based at least in part on the power amplifier nonlinearity;

perform a second frequency-domain to time-domain transform on the second set of frequency-domain tones to obtain a third set of time-domain samples, wherein the second frequency-domain to time-domain transform has a second transform size that is larger than the first transform size; and transmit signaling based at least in part on the third set of time-domain samples, wherein transmitting the signaling is based at least in part on performing the subband interference cancellation.

18. The apparatus of claim 17, wherein the instructions to perform the subband interference cancellation are executable by the processor to cause the apparatus to:
perform a second time-domain to frequency-domain transform on the power amplifier nonlinearity to obtain a frequency-domain power amplifier nonlinearity; and subtract the frequency-domain power amplifier nonlinearity from the second set of frequency-domain tones.

19. The apparatus of claim 18, wherein the instructions to perform the subband interference cancellation are executable by the processor to cause the apparatus to:
  apply a frequency-domain weighting to the frequency-domain power amplifier nonlinearity prior to subtracting the frequency-domain power amplifier nonlinearity from the second set of frequency-domain tones.

20. The apparatus of claim 18, wherein the instructions are further executable by the processor to cause the apparatus to:
  determine the frequency-domain power amplifier nonlinearity across a first set of frequency resources corresponding to a resource allocation associated with the signaling and a second set of resources external to the resource allocation associated with the signaling.

21. The apparatus of claim 18, wherein a resource allocation associated with the signaling comprises multiple sets of non-contiguous resources and the first transform size is based at least in part on a size of the multiple sets of non-contiguous resources including one or more null resources between the multiple sets of non-contiguous resources, and the instructions are further executable by the processor to cause the apparatus to:
  apply, prior to performing the second frequency-domain to time-domain transform, an energy reduction scheme on a portion of the second set of frequency-domain tones associated with the one or more null resources between the multiple sets of non-contiguous resources.

22. The apparatus of claim 13, wherein the instructions are further executable by the processor to cause the apparatus to:
  determine a residual error associated with performing the crest factor reduction function on the first set of time-domain samples based at least in part on applying an inverse discrete Fourier transform function to a residual clipping associated with the crest factor reduction function on the first set of time-domain samples; and
  distribute the residual error across a frequency band associated with the signaling based at least in part on an error vector magnitude and an out-of-band emission associated with the signaling, wherein transmitting the signaling is based at least in part on distributing the residual error across the frequency band.

23. The apparatus of claim 22, wherein the instructions to distribute the residual error across the frequency band are executable by the processor to cause the apparatus to:
  allocate energy associated with the residual error to at least a subset of frequency-domain resources in the frequency band in accordance with a configured pattern.

24. An apparatus for wireless communication at a device, comprising:
  a processor;
  memory coupled with the processor; and
  instructions stored in the memory and executable by the processor to cause the apparatus to:
    apply a first phase ramp to a first set of frequency-domain tones;
    perform, subsequent to applying the first phase ramp to the first set of frequency-domain tones, a first frequency-domain to time-domain transform on the first set of frequency-domain tones to obtain a first set of time-domain samples, wherein the first frequency-domain to time-domain transform has a first transform size;
    perform a crest factor reduction function on the first set of time-domain samples to obtain a second set of time-domain samples in accordance with an interference pattern associated with simultaneous transmissions from each of multiple antennas at the device such that an expected error vector magnitude at a receiver satisfies a threshold error vector magnitude and while suppressing out of band emission;
    perform a first time-domain to frequency-domain transform on the second set of time-domain samples to obtain a pre-distorted set of frequency-domain tones;
    map the pre-distorted set of frequency-domain tones to at least a portion of a second set of frequency-domain tones, wherein the second set of frequency-domain tones is larger than the first set of frequency-domain tones;
    perform a second frequency-domain to time-domain transform on the second set of frequency-domain tones to obtain a third set of time-domain samples, wherein the second frequency-domain to time-domain transform has a second transform size that is larger than the first transform size; and
    transmit signaling based at least in part on the third set of time-domain samples.

25. An apparatus for wireless communication at a device, comprising:
  means for applying a first phase ramp to a first set of frequency-domain tones to obtain a phase-ramped set of frequency-domain tones;
  means, subsequent to the means for applying the first phase ramp to the first set of frequency-domain tones, for performing a first frequency-domain to time-domain transform on the first set of frequency-domain tones to obtain a first set of time-domain samples, wherein the first frequency-domain to time-domain transform has a first transform size, wherein the first phase ramp corresponds to a first time-domain shift for the first set of time-domain samples, wherein performing the first frequency-domain to time-domain transform comprises performing the first frequency-domain to time-domain transform on the phase-ramped set of frequency-domain tones;
  means for performing a crest factor reduction function on the first set of time-domain samples to obtain a second set of time-domain samples;
  means for performing a first time-domain to frequency-domain transform on the second set of time-domain samples to obtain a pre-distorted set of frequency-domain tones;
  means for applying an inverse of the first phase ramp to the pre-distorted set of frequency-domain tones to remove the first time-domain shift and to obtain a first pre-distorted set of frequency-domain tones;
  means for mapping the pre-distorted set of frequency-domain tones to at least a portion of a second set of frequency-domain tones, wherein the second set of frequency-domain tones is larger than the first set of frequency-domain tones;
  means for performing a second frequency-domain to time-domain transform on the second set of frequency-domain tones to obtain a third set of time-domain samples, wherein the second frequency-domain to time-domain transform has a second transform size that is larger than the first transform size; and
  means for transmitting signaling based at least in part on the third set of time-domain samples, wherein the means for transmitting the signaling is based at least in part on applying the inverse of the first phase ramp to the pre-distorted set of frequency-domain tones to remove the first time-domain shift.

26. A non-transitory computer-readable medium storing code for wireless communication at a device, the code comprising instructions executable by a processor to:

apply a first phase ramp to a first set of frequency-domain tones to obtain a phase-ramped set of frequency-domain tones;

perform, subsequent to applying the first phase ramp to the first set of frequency-domain tones, a first frequency-domain to time-domain transform on the first set of frequency-domain tones to obtain a first set of time-domain samples, wherein the first frequency-domain to time-domain transform has a first transform size, wherein the first phase ramp corresponds to a first time-domain shift for the first set of time-domain samples, wherein performing the first frequency-domain to time-domain transform comprises performing the first frequency-domain to time-domain transform on the phase-ramped set of frequency-domain tones;

perform a crest factor reduction function on the first set of time-domain samples to obtain a second set of time-domain samples;

perform a first time-domain to frequency-domain transform on the second set of time-domain samples to obtain a pre-distorted set of frequency-domain tones;

apply an inverse of the first phase ramp to the pre-distorted set of frequency-domain tones to remove the first time-domain shift and to obtain a first pre-distorted set of frequency-domain tones;

map the pre-distorted set of frequency-domain tones to at least a portion of a second set of frequency-domain tones, wherein the second set of frequency-domain tones is larger than the first set of frequency-domain tones;

perform a second frequency-domain to time-domain transform on the second set of frequency-domain tones to obtain a third set of time-domain samples, wherein the second frequency-domain to time-domain transform has a second transform size that is larger than the first transform size; and transmit signaling based at least in part on the third set of time-domain samples, wherein transmitting the signaling is based at least in part on applying the inverse of the first phase ramp to the pre-distorted set of frequency-domain tones to remove the first time-domain shift.

* * * * *